United States Patent
Berneth et al.

(10) Patent No.: US 7,106,489 B2
(45) Date of Patent: Sep. 12, 2006

(54) ELECTROCHROMIC DEVICE

(75) Inventors: Horst Berneth, Leverkusen (DE); Ralf Neigl, Yorktown Heights, NY (US); Igor Shelepin, Dolgoprudnyi (RU); Vladimir Gavrilov, Dolgoprudnyi (RU)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/275,857

(22) PCT Filed: May 7, 2001

(86) PCT No.: PCT/EP01/05135

§ 371 (c)(1),
(2), (4) Date: Jun. 2, 2003

(87) PCT Pub. No.: WO01/88060

PCT Pub. Date: Nov. 22, 2001

(65) Prior Publication Data

US 2003/0206326 A1 Nov. 6, 2003

(30) Foreign Application Priority Data

May 15, 2000 (DE) .................... 100 23 765

(51) Int. Cl.
*G02F 1/153* (2006.01)
*G03G 5/00* (2006.01)

(52) U.S. Cl. .................. 359/273; 359/268; 252/600

(58) Field of Classification Search ............ 252/600; 345/49, 105; 359/265, 267, 268, 273, 275
See application file for complete search history.

(56) References Cited

U.S. PATENT DOCUMENTS 3,280,701 A 10/1966 Donnelly et al. ........... 359/267

(Continued)

FOREIGN PATENT DOCUMENTS

WO 97/30134 8/1997

WO 98/44384 10/1998

OTHER PUBLICATIONS

Elektokhimiya, Jan. 1977, pp. 24-28, Translated from Elektrokhimiya, vol. 13, No. 1, pp. 32-37, I.V. Shelepin, O.A. Ushakov, N. I. Karpova and V.A. Barachevskii, "Electrochromism of Organic Compounds I. Electrochemical and Spectral Properties of a System Based on Methyleviologen and 3-Ethyl-2-Benzothiazolone Azine".

(Continued)

*Primary Examiner*—David N. Spector
(74) *Attorney, Agent, or Firm*—Norris McLaughlin & Marcus PA

(57) ABSTRACT

An electrochromic device comprising a pair of glass, plastic plates or plastic films At least one plate or film, is provided with an electrically conductive coating. At least one plate or film and its conductive coating are transparent and the other may be mirrored. The plates or films are joined together and form a volume filled with an electrochromic medium which comprises at least one reducible electrochromic substance $OX_2$ and at least one oxidizable electrochromic substance $RED_1$. The $OX_2$ corresponds to the formula (CC)

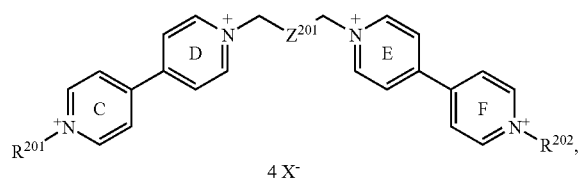

$4X^-$ in which $R^{201}$ and $R^{202}$, each are alkyl, cycloalkyl, alkenyl, aralkyl, aryl, $-[C(PQ)]^-$ or a bivalent bridge B, $Z^{201}$ is a bivalent radical of the formulae $CR^{210}R^{211}$, O, C=O or o-phenylene, $R^{210}$ and $R^{211}$, each are hydrogen, methyl or ethyl, or $CR^{210}R^{211}$ is $C_3$- to $C_7$-cycloalkane-1,1-diyl. The rings C, D, E and F, each may be substituted by up to 4 alkyl and/or alkoxy radicals, or respectively, may be linked via a $-(CH_2)_4-$ or $-CH=CH-CH=CH-$ bridge. P and Q, each are $-CN$ or $-COO$-alkyl. $X-$ is an anion.

6 Claims, 1 Drawing Sheet

U.S. PATENT DOCUMENTS

| | | | |
|---|---|---|---|
| 4,902,108 A | 2/1990 | Byker | 359/265 |
| 5,140,455 A | 8/1992 | Varaprasad et al. | 359/275 |
| 5,151,816 A | 9/1992 | Varaprasad et al. | 359/275 |
| 6,207,292 B1 | 3/2001 | Berneth et al. | 428/583 |
| 6,241,916 B1 | 6/2001 | Claussen et al. | 252/583 |

OTHER PUBLICATIONS

J. Amer. Chem. Soc. 108, (month unvailable) 1986, pp. 3380-3385, Stephen J. Atherton, K. Taukahara and R.G. Wilkins, "Reactions of Three Bis(viologen) Tetraquaternary Salts and Their Reduced Radicals".

J. Chem. Soc., Perkin Trans 3, (month unavailabe) 1996, pp. 225-228, Xuehui Sun and Yu-kun Yang, "Photochromism of double-bridged viologens in a polar polymer matrix".

Bull Chem. Soc. Jpn., 55, (month unavailable) 1982, pp. 513-516, Masaoki Furue and Shun-ichi Nozakura, "Photoreduction of Bisviologen Compounds, Viologen-$(CH_2)_n$-Viologen, by 2-Propanol".

Tetrahedron, vol. 42, No. 6 (month unavailable) 1986, pp. 1665-1677, Wolfram Geuder, Siegried Hüng and Aldolf Suchy, "Single and Double Bridged Viologenes and Intramolecular Pimerzation of their Cation Radicals".

Angew Chem 90, Dec. 1978, pp. 927-938, Von Klaus Deuchert und Siegried Hünig, Mehrtufig organische Rodoxsystem—ein allgemeines Strukturprinzip Translation attached also.

Topics in Current Chemistry, vol. 92, (month unavailable), pp. 1-44, Seigfried Hünig and Horst Berneth, "Two Step Reversible Redox Systems of the Weitz Type".

Sun X et al: "Photochromism of Double-Bridged Viologens in a Polar Polymer Matriz" Journal of the Chemical Society, Perkin Transactions 1, Chemical Society, Letchworth, GB, 1996, Seiten 225-228, XP001013322 ISSN: 1472-7781 in der Anmeldung erwahnt das genze Dokument.

Attalla M I et al: "Formation of Radical Trication and Diradical Dications by the Polyarographic Reduction of 1, 1-Alkanediyl-Bis-(1'Alkyl-4,4-Bipyridinum) Tetraquaternary Salts" Zeitschrift Fuer Naturforschung, Teil B: Anorganische Chemie, Organische Chemie, Verlag Der Zeitschriften Fuer Naturforschung,, DE, BD. 39B, 1984, Seiten 74-78, XP001012631 in der Anmeldung erwähnt Seite 74-Seite 75.

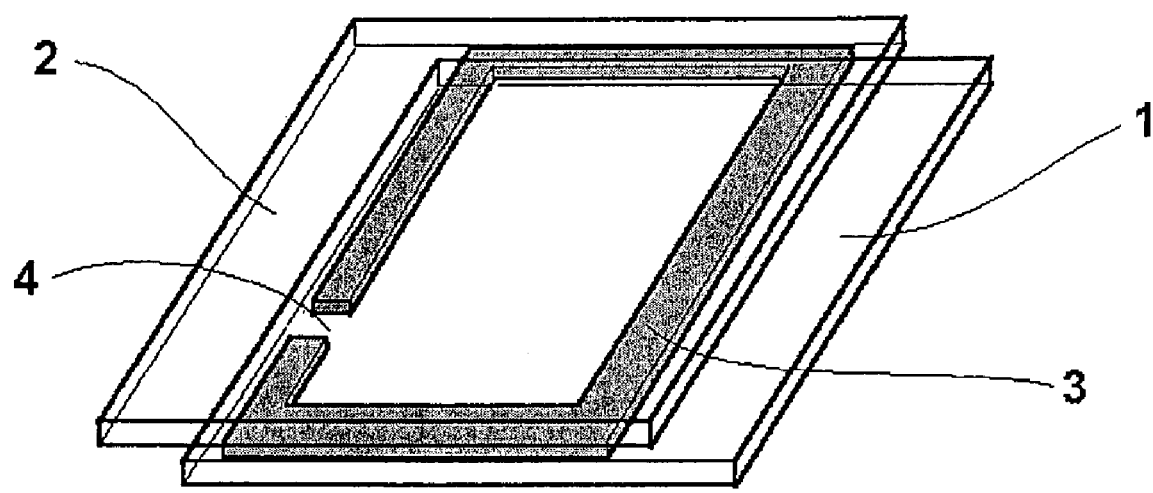

ELECTROCHROMIC DEVICE

BACKGROUND OF THE INVENTION

(1) Field of the Invention

The present invention relates to an electrochromic device, and to electrochromic substances.

Electrochromic devices are already known, for example from D. Theis in Ullmann's Encyclopaedia of Industrial Chemistry, vol. A 8, p. 622, Verlag Chemie 1987 and WO-A 94/23333. A distinction is made between two basic types:

(2) Description of Related Art

Type 1: full-area electrochromic devices;

Type 2: electrochromic display devices having structured electrodes.

Type 1 is used, for example, in electrically darkenable window panes or electrically dimmable automobile mirrors. Such devices are disclosed, for example, in U.S. Pat. No. 4,902,108.

Type 2 is used in segment and matrix displays. Such display devices are proposed, for example, in DE-A 196 31 728. Devices of this type can be observed transmissively or, in the case of reflection, reflectively.

WO-A 94/23333 compares electrochromic materials having different constructions, but these are not used as display devices:

Construction a: the electrochromic substances are in the form of a fixed film or layer on the electrodes (Ullmann, see above).

Construction b: the electrochromic substances are deposited on the electrodes as a layer by the redox process (Ullmann, see above).

Construction c: the electrochromic substances remain permanently in solution.

For construction a), the best-known electrochromic material is the tungsten oxide/palladium hydride pair.

For construction b), viologens have been described as electrochromic substances. These devices are not self-erasing, i.e. the image produced remains after the current has been switched off and can only be erased again by reversing the voltage. Such devices are not particularly stable and do not allow a large number of switching cycles.

In addition, such cells constructed using tungsten oxide/palladium hydride in particular cannot be operated in transmitted light, but only reflectively, owing to light scattering at these electrochromic layers.

Elektrokhimiya 13, 32–37 (1977), U.S. Pat. Nos. 4,902,108 and 5,140,455 disclose an electrochromic system of the latter construction c). An electrochromic cell which is constructed from glass plates with a conductive coating comprises a solution of a pair of electrochromic substances in an inert solvent.

The pair of electrochromic substances used is one electrochemically reversibly reducible substance and one reversibly oxidizable substance. Both substances are colourless or only weakly coloured in the ground state. Under the action of an electric voltage, one substance is reduced and the other oxidized, both becoming coloured. When the voltage is switched off, the ground state re-forms in the case of both substances, resulting in disappearance or fading of the colour.

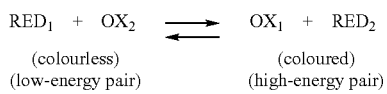

U.S. Pat. No. 4,902,108 discloses that suitable pairs of redox substances are those in which the reducible substance has at least two chemically reversible reduction waves in the cyclic voltammogram and the oxidizable substance correspondingly has at least two chemically reversible oxidation waves.

Various applications have been described for electrochromic cells of construction c). For example, they can be formed as automobile rear-view mirrors which can be darkened during night driving by application of a voltage and thus prevent dazzling by the headlamps of following vehicles (U.S. Pat. Nos. 3,280,701, 4,902,108 and EP-A 0 435 689). Furthermore, such cells can also be employed in window panes or automobile sunroofs, where they darken the sunlight after application of a voltage. Likewise described is the use of such devices as electrochromic display devices, for example in segment or matrix displays having structured electrodes (DE-A 196 31 728).

The electrochromic cells normally consist of a pair of glass plates, of which, in the case of the automobile mirror, one is mirrored. One side of these plates is coated over its surface with a light-transparent, electroconductive layer, for example indium-tin oxide (ITO), and in the case of display devices this conductive coating is divided into electrically separated segments provided with individual contacts. These plates are used to construct a cell by joining them by means of a sealing ring with their electroconductively coated sides facing one another to form a cell. This cell is filled with an electrochromic liquid via an opening, and the cell is tightly sealed. The two plates are connected to a voltage source via the ITO layers.

For many applications it is important to be able to adapt the colour of the electrochromic device in the energized state to the particular requirements. A colour which is as neutral as possible is often desired, for example a grey colour. Although dipyridinium salts (viologens) and dihydrophenazines are proven electrochromic compounds, mixing them results in a greenish blue colour (e.g. U.S. Pat. No. 4,902,108, WO 97/30134). WO 98/44384 discloses derivatives of dipyridinium salts and dihydrophenazines whose colours are different from the parent compounds. By appropriate mixing of up to 5 electrochromic compounds of this type, a preselected colour can be achieved, including, for example, a grey colour. However, complex mixtures of this type are difficult to balance, especially when the electrochromic device is to be operated at different voltages and the colour is to be independent from the voltage. Furthermore, the dipyridinium salt and dihydrophenazine derivatives disclosed in WO 98/44384 are not always readily obtainable.

Accordingly, there was a need for an electrochromic compound which harmonizes well with dipyridinium salts and dihydrophenazines in terms of redox behaviour, provides the missing red component in admixture with dipyridinium salts and dihydrophenazines in the solvents customary for electrochromic cells, and is readily obtainable synthetically.

BRIEF SUMMARY OF THE INVENTION

One aspect of the invention is to provide an electrochromic device comprising a pair of glass or plastic mates or plastic films of which at least one plate or film, preferably both plates or films, are provided on in each case one side with an electrically conductive coating, of which at least one plate or film and its conductive coating are transparent, of which the other may be mirrored, and of which in the case of at least one of the two plates or films the electrically conductive layer can be divided into separate, individually contacted area segments, where the plates or films are joined together via a sealing ring on the sides of their conductive coating, and the volume formed by the two plates or films and the sealing ring is filled with an electrochromic medium which comprises at least one reducible electrochromic substance $OX_2$ and at least one oxidizable electrochromio substance $RED_1$, characterized in that one $OX_2$ corresponds to the formula

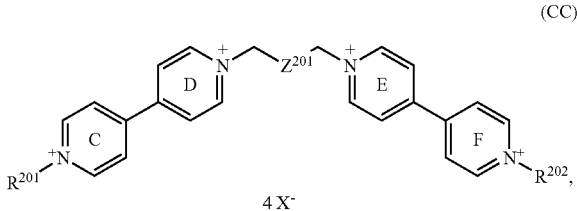

(CC)

in which
- $R^{201}$ and $R^{202}$, independently of one another, are alkyl, cycloalkyl, alkenyl, aralkyl, aryl, —[C(PQ)]⁻ or a bivalent bridge B,
- $Z^{201}$ is a bivalent radical of the formulae $CR^{210}R^{211}$, O, C=O or o-phenylene,
- $R^{210}$ and $R^{211}$, independently of one another, are hydrogen, methyl or ethyl, or
- $CR^{210}R^{211}$ is $C_3$- to $C_7$-cycloalkane-1,1-diyl,
- the rings C, D, E and F, independently of one another, may be substituted by up to 4 alkyl and/or alkoxy radicals, or the rings C and D or the rings E and F, respectively, may be linked via a —(CH₂)₄— or —CH=CH—CH=CH— bridge,
- P and Q, independently of one another, are —CN or —COO-alkyl, and
- X⁻ is an anion.

DETAILED DESCRIPTION OF THE INVENTION

It has now been found that bridged viologens of the formula (CC)

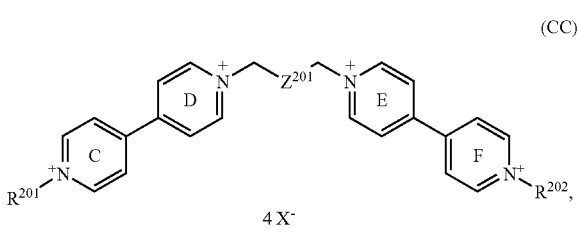

(CC)

in which
- $R^{201}$ and $R^{202}$, independently of one another, are alkyl, cycloalkyl, alkenyl, aralkyl, aryl, —[C(PQ)]⁻ or a bivalent bridge B,
- $Z^{201}$ is a bivalent radical of the formulae $CR^{210}R^{211}$, O, C=O or o-phenylene,
- $R^{210}$ and $R^{211}$, independently of one another, are hydrogen, methyl or ethyl, or
- $CR^{210}R^{211}$ is $C_3$- to $C_7$-cycloalkane-1,1-diyl,
- the rings C, D, E and F, independently of one another, may be substituted by up to 4 alkyl and/or alkoxy radicals, or the rings C and D or the rings E and F, respectively, may be linked via a —(CH₂)₄— or —CH=CH—CH=CH— bridge,
- P and Q, independently of one another, are —CN or —COO-alkyl, and
- X⁻ is an anion, represent such a desired electrochromic compound.

Very surprisingly, it has been found that bridged viologens of the formula (CC) result in significantly improved light stability compared to corresponding unbridged viologens when used in electrochromic devices.

The invention accordingly provides an electrochromic device comprising a pair of glass or plastic plates or plastic films of which at least one plate or film, preferably both plates or films, are provided on in each case one side with an electrically conductive coating, of which at least one plate or film and its conductive coating is transparent, of which the other may be mirrored, and of which in the case of at least one of the two plates or films the electrically conductive layer can be divided into separate, individually contacted area segments, where the plates or films are joined together via a sealing ring on the sides of their conductive coating, and the volume formed by the two plates or films and the sealing ring is filled with an electrochromic medium which comprises at least one reducible electrochromic substance $OX_2$ and at least one oxidizable electrochromic compound $RED_1$, characterized in that one $OX_2$ corresponds to the formula

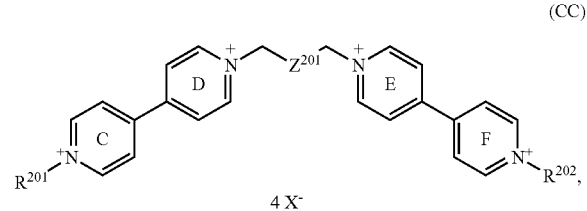

(CC)

in which
- $R^{201}$ and $R^{202}$, independently of one another, are alkyl, cycloalkyl, alkenyl, aralkyl, aryl, —[C(PQ)]⁻ or a bivalent bridge B,
- $Z^{201}$ is a bivalent radical of the formulae $CR^{210}R^{211}$, O, C=O or o-phenylene,
- $R^{210}$ and $R^{211}$, independently of one another, are hydrogen, methyl or ethyl, or
- $CR^{210}R^{211}$ is $C_3$- to $C_7$-cycloalkane-1,1-diyl,
- the rings C, D, E and F, independently of one another, may be substituted by up to 4 alkyl and/or alkoxy radicals, or the rings C and D or the rings E and F, respectively, may be linked via a —(CH₂)₄— or —CH=CH—CH=CH— bridge, P and Q, independently of one another, are —CN or —COO-alkyl, and $X^-$ is an anion.

Some bridged bipyridinium salts of the formula (CC) are already known (e.g. Bull. Chem. Soc. Japan 55 (1982) 513; J. Amer. Chem. Soc. 108 (1986) 3380; Z. Naturforsch. 39b (1984 74; Tetrahedron 42 (1986) 1665; J. Chem. Soc., Perkin Trans. 2 1996 225).

The use of bipyridinium salts (viologens) linked via a bridge in electrochromic devices is known, for example, from U.S. Pat. No. 4,902,108. However, this document provides a general formulation of the bridge. Specific mention is merely made of a derivative having a $C_4$ bridge (tetramethylene bis[4(1-benzylpyridin-4'-yl)-pyridinium] tetrafluoroborate, example II, VI). Like unbridged viologens, this compound and compounds with longer bridges result in a blue color when reduced and are thus unsuitable for use as the red component desired.

Preference is given to an electrochromic device comprising at least one $OX_2$ of the formula (CC), wherein
$R^{201}$ and $R^{202}$, independently of one another, are $C_1$- to $C_{18}$-alkyl, $C_3$- to $C_8$-cyclo-alkyl, $C_2$- to $C_{18}$-alkenyl, $C_7$- to $C_{10}$-aralkyl, $C_6$- to $C_{10}$-aryl or $-[C(CN)_2]^-$, $-[C(CN)COO-C_1$- to $-C_4$-alkyl]$^-$ or $-[C(COO-C_1$- to $-C_4$-alkyl)_2]^-$, $Z^{201}$ is $CH_2$, C=O or o-phenylene, the rings C, D, E and F, independently of one another, may be substituted by up to 4 methyl radicals, or the rings C and D or the rings E and F, respectively, may be linked via a $-(CH_2)_4-$ or $-CH=CH-CH=CH-$ bridge, and $X^-$ is an anion.

Particular preference is given to an electrochromic device comprising at least one $OX_2$ of the formula (CC), wherein
$R^{201}$ and $R^{202}$, independently of one another, are methyl, ethyl, propyl, butyl, pentyl, hexyl, heptyl, octyl, benzyl, phenethyl, phenylpropyl, phenylbutyl or phenyl, $Z^{201}$ is $CH_2$, C=O or o-phenylene, the rings C and D or the rings E and F, respectively, may be linked via a $-CH=CH-CH=CH-$ bridge, and $X^-$ is an anion.

$R^{201}$ and $R^{202}$ and the rings C to F are very particularly preferably identical.

Very particularly preferably, $R^{211}$ and $R^{212}$ are methyl, butyl, heptyl or phenylpropyl and are identical to one another $Z^{201}$ is $CH_2$ and the rings C and D or E and F, respectively, are not linked via a bridge.

An $OX_2$ of the formula (CC) can also be part of an oligomeric or polymeric compound.

Preference is therefore also given to an electrochromic device comprising at least one $OX_2$ of the formula (CC), wherein
at least one of $R^{201}$ and $R^{202}$ is a bivalent bridge B and, if applicable, the other is $C_1$- to $C_{18}$-alkyl, $C_3$- to $C_8$-cycloalkyl, $C_2$- to $C_{18}$-alkenyl, $C_7$- to $C_{10}$-aralkyl, $C_6$- to $C_{10}$-aryl or $-[C(CN)_2]^-$, $-[C(CN)COO-C_1$- to $-C_4$-alkyl]$^-$ or $-[C(COO-C_1$- to $-C_4$-alkyl)_2]^-$, $Z^{201}$ is $CH_2$, C=O or o-phenylene, the rings C, D, E and F, independently of one another, may be substituted by up to 4 methyl radicals, or the rings C and D or the rings E and F, respectively, may be linked via a $-CH_2)_4-$ or $-CH=CH-CH=CH-$ bridge, and $X^-$ is an anion, where another electrochromic substance of the formula (CC) or another electrochromic substance $OX_2$ or $RED_1$ may be attached via the bridge B.

Particular preference is given to an electrochromic device comprising at least one $OX_2$ of the formula (CC) which is part of one of the formulae

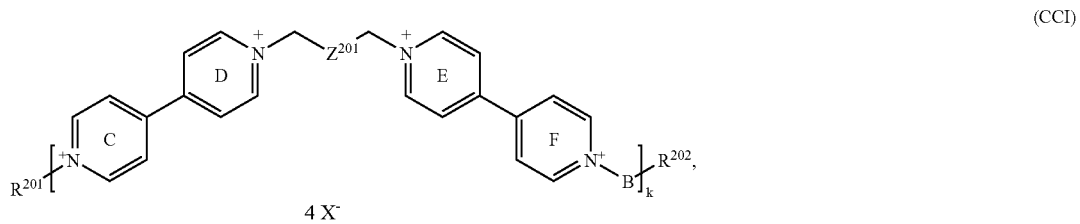

(CCI)

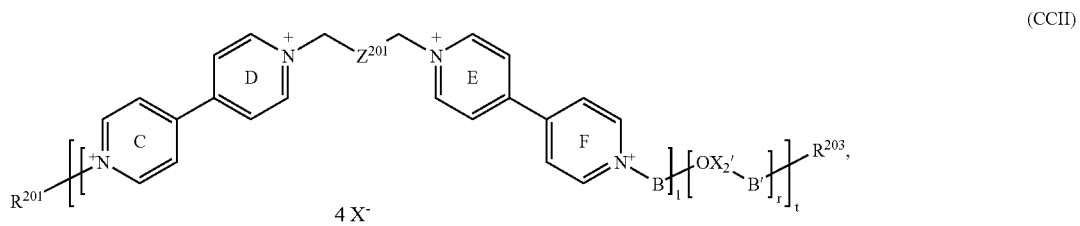

(CCII)

-continued

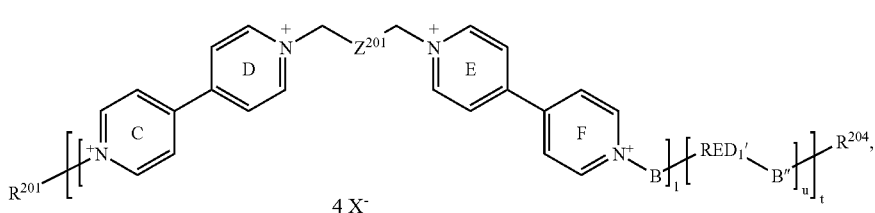

(CCIII)

4 X⁻

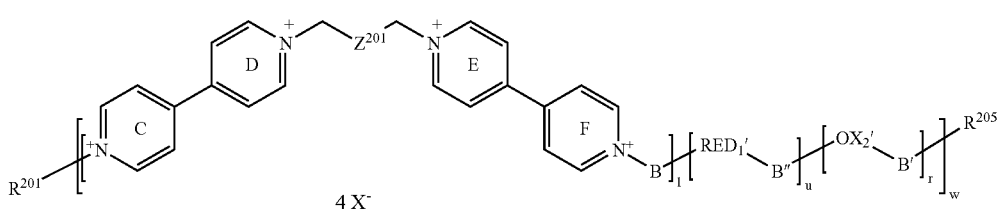

(CCIV)

4 X⁻

$R^{201}$ and —B—$R^{202}$, independently of one another, are methyl, ethyl, propyl, butyl, pentyl, hexyl, heptyl, octyl, benzyl, phenethyl, phenylpropyl, phenylbutyl or phenyl, or $R^{201}$ and $R^{202}$ in formula (CCI) together are a direct bond, In the formulae, the different parts of the formula which are denoted by brackets and an index can be in any sequence with respect to one another. By way of example, formula (CCIII) therefore includes, for example, the following formula:

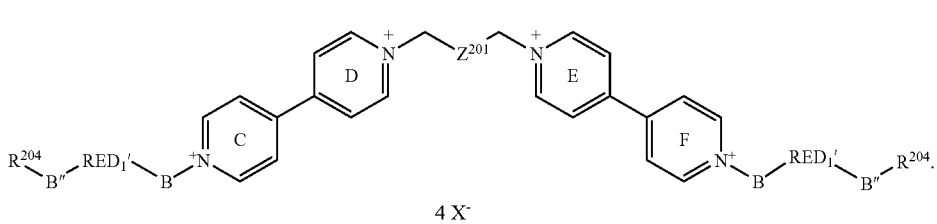

(CCIII')

4 X⁻ and $R^{201}$ in formula (CCII), (CCIII) and (CCIV) may be —B—[OX$_2$'—B'—]$_r$—$R^{203}$ or —B—[RED$_1$'—B"—]$_u$—$R^{204}$ or —B—[RED$_1$'-B"—]$_u$—[OX$_2$'—B'—]$_r$—$R^{205}$, $Z^{201}$ is CH$_2$, C=O or o-phenylene, the rings C and D or the rings E and F, respectively, may be linked via a —CH=CH—CH=CH— bridge, B, B' and B", independently of one another, are a bivalent bridge, —B'—$R^{203}$, —B"—$R^{204}$ and —B'—$R^{205}$, independently of one another, are hydrogen or methyl, ethyl, propyl, butyl, pentyl, hexyl, heptyl, octyl, benzyl, phenethyl, phenylpropyl, phenylbutyl or phenyl, OX$_2$' is the radical of a reversibly electrochemically reducible redox system, and RED$_1$' is the radical of a reversibly electrochemically oxidizable redox system, k is an integer from 2 to 1000, l, r and u, independently of one another, are integers from 1 to 100, t and w, independently of one another, are integers from 1 to 1000, and X⁻ is an anion.

Preferably, B, B' and B" are a bridge of the formulae —(CH$_2$)$_n$— or —[Y$^1_s$(CH$_2$)$_m$—Y$^2$]$_o$—(CH$_2$)$_p$—Y$^3_q$—, which may be substituted by C$_1$- to C$_4$-alkyl, C$_1$- to C$_4$-alkoxy, halogen or phenyl, Y$^1$ to Y$^3$, independently of one another, are O, S, NR$^{60}$, COO, CONH, NHCONH, cyclopentanediyl, cyclohexanediyl, phenylene or naphthylene, $R^{60}$ is C$_1$- to C$_6$-alkyl, C$_2$- to C$_6$-alkenyl, C$_4$- to C$_7$-cycloalkyl, C$_7$- to C$_{15}$-aralkyl or C$_6$- to C$_{10}$-aryl, n is an integer from 1 to 12, m and p, independently of one another, are integers from 0 to 8, o is an integer from 0 to 6, and q and s, independently of one another, are 0 or 1, but are a direct bond in the radicals —B—$R^{202}$, —B'—$R^{203}$, —B"—$R^{204}$ and —B'—$R^{205}$.

Particularly preferably, B, B' and B" are a bridge of the formulae —(CH$_2$)$_n$— or —(CH$_2$)$_m$—C$_6$H$_4$—(CH$_2$)$_p$—, in which n is an integer from 2 to 8, in particular from 3 to 5, m and p, independently of one another, are integers from 1 to 4, in particular 1, and —C$_6$H$_4$— is o-, m- or p-substituted, but are a direct bond in the radicals —B—$R^{202}$, —B'—$R^{203}$, —B''—$R^{204}$ and —B'—$R^{205}$.

The preferred meanings of $OX_2'$ and $RED_1'$ are illustrated hereinbelow.

Very particular preference is given to an electrochromic device comprising an electrochromic substance of the formula (CCI), in which
$R^{201}$ and —B—$R^{202}$ are methyl, butyl, heptyl or phenylpropyl and are identical to one another,
$Z^{201}$ is $CH_2$,
B is —$(CH_2)_3$— or —$(CH_2)_4$—,
k is an integer from 2 to 100,
the rings C and D or E and F, respectively, are not bridged and
$X^-$ is an anion.

Very particular preference is likewise given to an electrochromic device comprising an electrochromic substance of the formula (CCIII), in which
$R^{201}$ is methyl, butyl, heptyl or phenylpropyl,
$Z^{201}$ is $CH_2$,
B is —$(CH_2)_3$— or —$(CH_2)_4$—,
l, u and t are 1,
$RED_1'$-B''—$R^{204}$ is the radical of a reversibly electrochemically oxidizable redox system as described below in more detail,
the rings C and D or E and F, respectively, are not bridged, and
$X^-$ is an anion.

In addition to electrochromic substances $OX_2$ of the formulae (CC), (CCI) and (CCII), the electrochromic device according to the invention comprises at least one electrochromic substance $RED_1$. However, it can also comprise further $RED_1$ and/or $OX_2$. This also applies to those electrochromic devices according to the invention which comprise electrochromic substances of the formulae (CCIII) and/or (CCIV).

By selection of the electrochromic compounds $RED_1$ and $OX_2$ and/or mixtures thereof, any desired monochromic colours can be established. For a polychromic colour display, two or more such electrochromic devices can be placed flat one on top of the other, with each of these devices being capable of producing a different colour. Such a stack is preferably built up in such a way that the devices in contact with one another have a common light-transparent plate, which is then provided with a conductive coating on both sides and, depending on the design, divided into segments. A stack then consists, for example, of three electrochromic devices consisting of at least four plates. By switching on segments in various of these stacked devices, multicoloured displays can be achieved. If consecutive segments in different devices of this kind are switched on, mixed colours are obtained. Thus, any desired colours can be displayed in the context of trichromicity, i.e., for example, coloured images.

However, preference is given to electrochromic devices according to the invention which, in the energized state, are grey or black in colour as a result of mixing the electrochromic substances of the formulae (CC) to (CCIV) with one another and/or with other suitable electrochromic substances $OX_2$ and/or $RED_1$.

Suitable reducible electrochromic substances $OX_2$ and oxidizable electrochromic substances $RED_1$ are the following compounds, where a) the reducible substance has at least one, preferably at least two, chemically reversible reduction waves in the cyclic voltammogram and the oxidizable substance correspondingly has at least one, preferably at least two, chemically reversible oxidation waves, or b) the reducible substance and the oxidizable substance are covalently bonded to one another via a bridge B, or c) the reducible and/or oxidizable substances selected are those in which the reversible transition between the oxidizable form and the reducible form or vice versa is associated with the breaking or forming of a σ bond, or d) the reducible substance and/or the oxidizable substance are metal salts or metal complexes of those metals which exist in at least two oxidation states, or e) the reducible and/or oxidizable substances are oligomers and polymers containing at least one of said redox systems, but also pairs of such redox systems as defined under a) to d).

Suitable $OX_2$ and $RED_1$ for the purposes of the invention are substances which, on reduction or oxidation at the cathode or anode in the solvent mentioned, give products $RED_2$ and $OX_1$ which do not undergo any subsequent chemical reaction, but instead can be fully oxidized or reduced back to $OX_2$ and $RED_1$.

Examples of suitable reducible substances $OX_2$ are

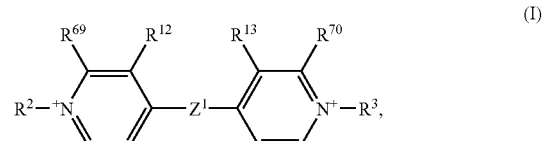

(I)

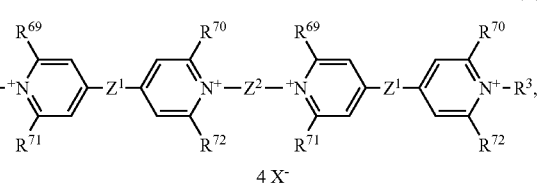

(II)

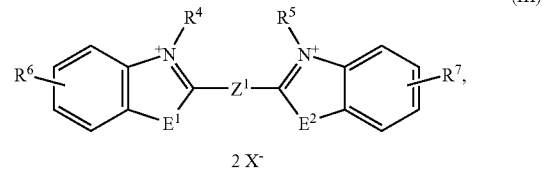

(III)

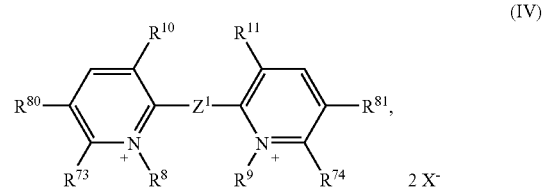

(IV)

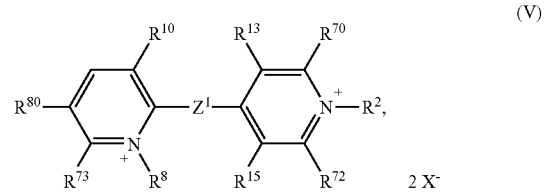

(V)

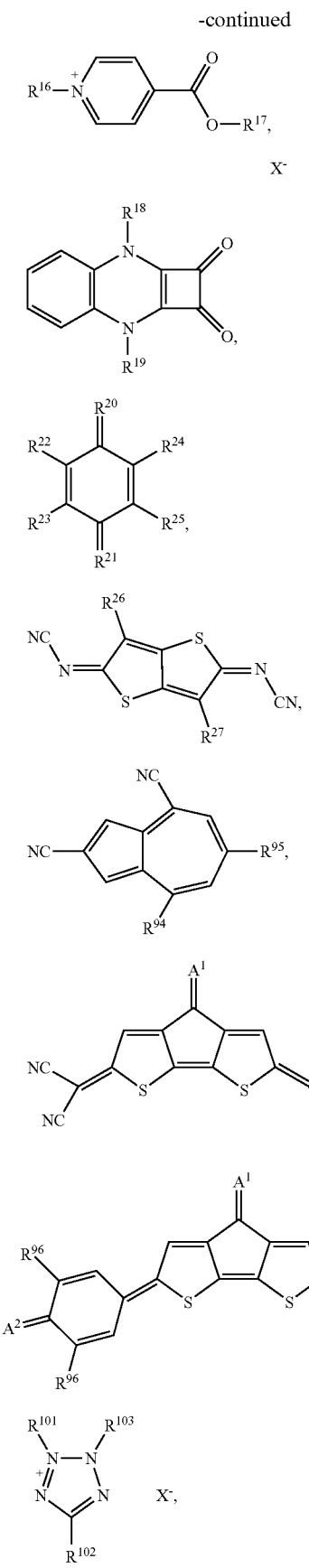

in which
R² to R⁵, R⁸, R⁹, R¹⁶ to R¹⁹, independently of one another, are C₁- to C₁₈-alkyl, C₂- to C₁₂-alkenyl, C₄- to C₇-cycloalkyl, C₇- to C₁₅-aralkyl or C₆- to C₁₀-aryl, or R⁴; R⁵ or R⁸; R⁹ together can form a —(CH₂)₂— or —(CH₂)₃— bridge, R⁶, R⁷ and R²² to R²⁵, independently of one another, are hydrogen, C₁- to C₄-alkyl, C₁- to C₄-alkoxy, halogen, cyano, nitro or C₁- to C₄-alkoxycarbonyl, or R²²; R²³ and/or R²⁴; R²⁵ can form a —CH=CH—CH=CH— bridge, R¹⁰; R¹¹, R¹⁰; R¹³, R¹²; R¹³ and R¹⁴; R¹⁵, independently of one another, are hydrogen or in pairs are a —(CH₂)₂—, —(CH₂)₃— or —CH=CH— bridge, R²⁰ and R²¹, independently of one another, are O, N—CN, C(CN)₂ or N—C₆- to C₁₀-aryl, R²⁶ and R²⁷ are hydrogen, C₁- to C₄-alkyl, C₁- to C₄-alkoxy, halogen, cyano, nitro, C₁- to C₄-alkoxycarbonyl or C₆- to C₁₀-aryl, R⁶⁹ to R⁷⁴, R⁸⁰ and R⁸¹, independently of one another, are hydrogen or C₁- to C₆-alkyl, or R⁶⁹; R¹², R⁷⁰; R¹³, R⁷³; R⁸⁰ and/or R⁷⁴; R⁸¹ together form a —CH=CH—CH=CH— bridge, E¹ and E², independently of one another, are O, S, NR¹ or C(CH₃)₂, or E¹ and E² together form an —N—(CH₂)₂—N— bridge, R¹ is C₁- to C₁₈-alkyl, C₂- to C₁₂-alkenyl, C₄- to C₇-cycloalkyl, C₇- to C₁₅-aralkyl or C₆- to C₁₀-aryl, Z¹ is a direct bond, —CH=CH—, —C(CH₃)=CH—, —C(CN)=CH—, —CCl=CCl—, —C(OH)=CH—, —CCl=CH—, —C≡C—, —CH=N—N=CH—, —C(CH₃)=N—N=C(CH₃)— or —CCl=N—N=CCl—, Z² is —(CH₂)ᵣ— or —CH₂—C₆H₄—CH₂—, r is an integer from 1 to 10, R⁹⁴ and R⁹⁵, independently of one another, are hydrogen or cyano, R¹⁰¹ to R¹⁰⁵, independently of one another, are C₆- to C₁₀-aryl or an optionally benzo-fused aromatic or quasi-aromatic, five- or six-membered heterocyclic ring, $R^{107}$, $R^{109}$, $R^{113}$ and $R^{114}$, independently of one another, are a radical of the formulae (CV) to (CVII)

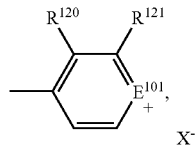 (CV)

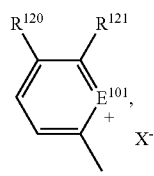 (CVI)

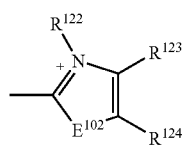 (CVII)

$R^{108}$, $R^{115}$ and $R^{116}$, independently of one another, are $C_6$- to $C_{10}$-aryl or a radical of the formula (CV), $R^{110}$ to $R^{112}$, $R^{117}$ and $R^{118}$, independently of one another, are hydrogen, $C_1$- to $C_4$-alkyl, halogen or cyano, $E^{101}$ and $E^{102}$, independently of one another, are O, S or N—$R^{119}$, $R^{119}$ and $R^{122}$, independently of one another, are $C_1$- to $C_{18}$-alkyl, $C_2$- to $C_8$-alkenyl, $C_4$- to $C_7$-cycloalkyl, $C_7$- to $C_{15}$-aralkyl or $C_6$- to $C_{10}$-aryl, $R^{106}$, $R^{120}$, $R^{121}$, $R^{123}$ and $R^{124}$, independently of one another, are hydrogen, $C_1$- to $C_4$-alkyl, $C_1$- to $C_4$-alkoxy, halogen, cyano, nitro or $C_1$- to $C_4$-alkoxycarbonyl, or $R^{120}$, $R^{121}$ or $R^{123}$, $R^{124}$ together form a —CH=CH—CH=CH— bridge, $A^1$, $A^2$ and $A^3$, independently of one another, are O or $C(CN)_2$, $R^{96}$ is hydrogen, phenyl or tert-butyl, and $X^-$ is an anion which is redox-inert under the conditions.

Examples of suitable oxidizable substances $RED_1$ are

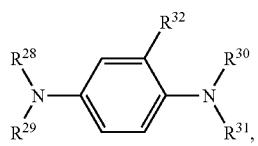 (XX)

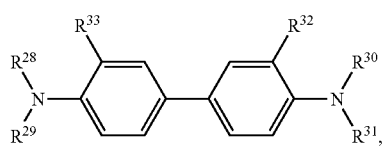 (XXI)

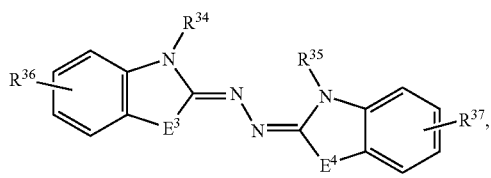 (XXII)

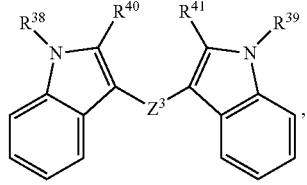 (XXIII)

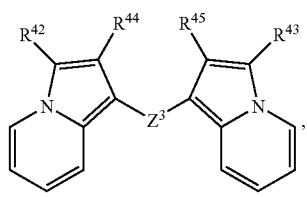 (XXIV)

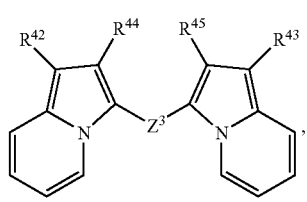 (XXV)

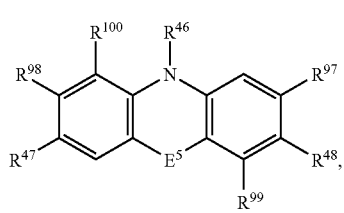 (XXVI)

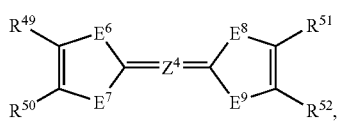 (XXVII)

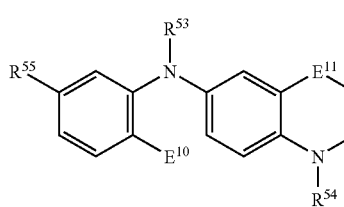 (XXVIII)

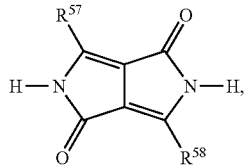 (XXIX)

-continued

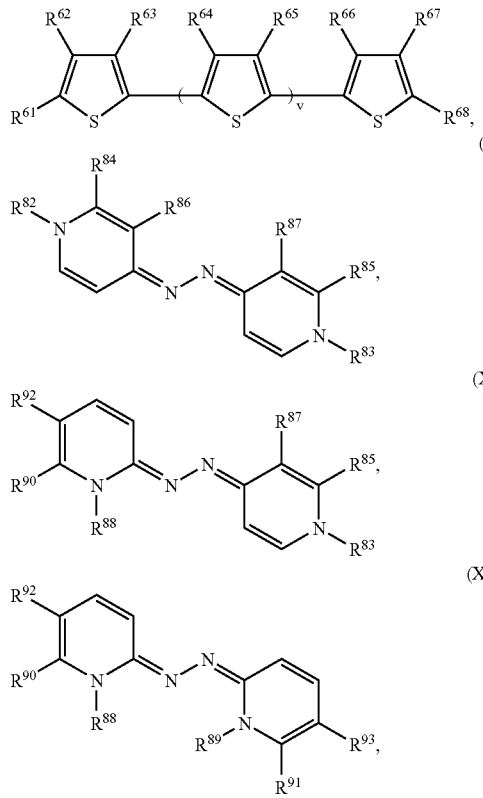

in which
R$^{28}$ to R$^{31}$, R$^{34}$, R$^{35}$, R$^{38}$, R$^{39}$, R$^{46}$, R$^{53}$ and R$^{54}$, independently of one another, are C$_1$- to C$_{18}$-alkyl, C$_2$- to C$_{12}$-alkenyl, C$_4$- to C$_7$-cycloalkyl, C$_7$- to C$_{15}$-aralkyl or C$_6$- to C$_{10}$-aryl, R$^{32}$, R$^{33}$, R$^{36}$, R$^{37}$, R$^{40}$, R$^{41}$, R$^{42}$ to R$^{45}$, R$^{47}$, R$^{48}$, R$^{49}$ to R$^{52}$, R$^{55}$ to R$^{58}$ and R$^{97}$, independently of one another, are hydrogen, C$_1$- to C$_4$-alkyl, C$_1$- to C$_4$-alkoxy, halogen, cyano, nitro, C$_1$- to C$_4$-alkoxycarbonyl, C$_6$- to C$_{10}$-aryl, and
R$^{57}$ and R$^{58}$ are additionally an aromatic or quasi-aromatic, five- or six-membered heterocyclic ring which is optionally benzo-fused, and R$^{48}$ is additionally NR$^{75}$R$^{76}$, or R$^{49}$; R$^{50}$ and/or R$^{51}$; R$^{52}$ form a —(CH$_2$)$_3$—, —(CH$_2$)$_4$—, —(CH$_2$)$_5$— or —CH═CH— bridge, Z$^3$ is a direct bond, a —CH═CH— or —N═N— bridge, ═Z$^4$═ is a direct double bond, a ═CH—CH═ or ═N—N═ bridge, E$^3$ to E$^5$, E$^{10}$ and E$^{11}$, independently of one another, are O, S, NR$^{59}$ or C(CH$_3$)$_2$, and E$^5$ is additionally C═O or SO$_2$, E$^3$ and E$^4$, independently of one another, can additionally be —CH═CH—, E$^6$ to E$^9$, independently of one another, are S, Se or NR$^{59}$, R$^{59}$, R$^{75}$ and R$^{76}$, independently of one another, are C$_1$- to C$_{12}$-alkyl, C$_2$- to C$_8$-alkenyl, C$_4$- to C$_7$-cycloalkyl, C$_7$- to C$_{15}$-aralkyl, C$_6$- to C$_{10}$-aryl, and
R$^{75}$ is additionally hydrogen or R$^{75}$ and R$^{76}$ in the definition of NR$^{75}$R$^{76}$ are, together with the N atom to which they are attached, a five- or six-membered ring, which optionally contains further heteroatoms, R$^{61}$ to R$^{68}$, independently of one another, are hydrogen, C$_1$- to C$_6$-alkyl, C$_1$- to C$_4$-alkoxy, cyano, C$_1$- to C$_4$-alkoxycarbonyl or C$_6$- to C$_{10}$-aryl, and R$^{61}$; R$^{62}$ and R$^{67}$; R$^{68}$, independently of one another, additionally form a —(CH$_2$)$_3$—, —(CH$_2$)$_4$— or —CH═CH—CH═CH— bridge, or R$^{62}$; R$^{63}$, R$^{64}$; R$^{65}$ and R$^{66}$; R$^{67}$ form an —O—CH$_2$CH$_2$—O— or —O—CH$_2$CH$_2$CH$_2$— bridge, v is an integer between 0 and 100, R$^{82}$, R$^{83}$, R$^{88}$ and R$^{89}$, independently of one another, C$_1$-C$_{18}$-alkyl, C$_2$- to C$_{12}$-alkenyl, C$_4$- to C$_7$-cycloalkyl, C$_7$- to C$_{15}$-aralkyl or C$_6$- to C$_{10}$-aryl, R$^{84}$ to R$^{87}$ and R$^{90}$ to R$^{93}$, independently of one another, are hydrogen or C$_1$- to C$_6$-alkyl, or R$^{84}$; R$^{86}$, R$^{85}$; R$^{87}$, R$^{90}$; R$^{92}$ and/or R$^{91}$; R$^{93}$ together form a —CH═CH—CH═CH— bridge.

Suitable as RED$_1$ are likewise anions, such as, for example, I$^-$, I$_3^-$, Br$^-$ and SCN$^-$.

Examples of optionally oligomeric or polymeric redox systems linked via a bridge B are those of the formula $$Y-[-(-B-Z-)_a-(-B-Y-)_b-]_c-B-Z \qquad (L),$$

in which
Y and Z, independently of one another, are an OX$_2$ or RED$_1$ radical, where either at least one Y is OX$_2$ and at least one Z is RED$_1$ or Y and Z are OX$_2$, where
OX$_2$ is the radical of a reversibly electrochemically reducible redox system, and RED$_1$ is the radical of a reversibly electrochemically oxidizable redox system, B is a bridging unit, c is an integer from 0 to 1000, and a and b, independently of one another, are integers from 0 to 100.

(a+b)·c is preferably ≦10,000.

The term reversibly electrochemically reducible or oxidizable here is taken to mean that electron transfer can take place with or without a change in the σ structure entirely within the sense of the abovementioned definition of OX$_2$ and RED$_1$ according to the invention.

The electrochromic compounds of the formula (L) are in particular taken to mean those of the formulae

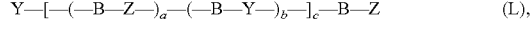 (La),

 (Lb),

 (Lc),

 (Ld),

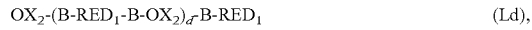 (Le)

or

 (Lf)

in which
OX$_2$, RED$_1$ and B are as defined above, d is an integer from 1 to 5, and e and f, independently of one another, are integers from 0 to 5.

$OX_2$ and $RED_1$ in the formulae (L) and (La) to (Lf) are taken to mean, in particular, radicals of the above-described redox systems of the formulae (I) to (X), (CI) to (CIV) and (XX) to (XXXIII) in which the bonding to the bridging unit B takes place via one of the radicals $R^2$ to $R^{19}$, $R^{22}$ to $R^{27}$ $R^{28}$; to $R^{58}$, $R^{61}$, $R^{62}$, $R^{67}$, $R^{68}$, $R^{83}$, $R^{88}$, $R^{122}$ or, in the case where one of the radicals $E^1$ or $E^2$ is $NR^1$ or one of the radicals $E^3$ to $E^{11}$ is $NR^{59}$ or one of the radicals $E^{101}$ to $E^{102}$ is $NR^{119}$, takes place via $R^1$, $R^{59}$ or $R^{119}$, and said radicals are then a direct bond, and B is a bridge of the formula $—(CH_2)_n—$ or $—[Y^1{}_s(CH_2)_m—Y^2]_o—(CH_2)_p—Y^3{}_q—$, which may be substituted by $C_1$- to $C_4$-alkyl, $C_1$- to $C_4$-alkoxy, halogen or phenyl, $Y^1$ to $Y^3$, independently of one another, are O, S, $NR^{60}$, COO, CONH, NHCONH, cyclopentanediyl, cyclohexanediyl, phenylene or naphthylene, $R^{60}$ is $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl, n is an integer from 1 to 12, m and p, independently of one another, are integers from 0 to 8, o is an integer from 0 to 6, and q and s, independently of one another, are 0 or 1.

$OX_2$ and $RED_1$ in the formulae (L) and (La) to (Lf) are very particularly taken to mean radicals of the above-described redox systems of the formulae (I), (V), (XX), (XXII), (XXIII), (XXV), (XXVI) and (XXXIII).

In another type of oligomeric or polymeric system, the $OX_2$ and/or $RED_1$ groups can also be attached to a main group, for example as side chains, for example to a poly(meth)acrylate, silicone, polycarbonate, polyurethane, polyurea, polyester, polyamide, cellulose or other oligomeric or polymeric systems.

Examples of metal salts or metal complexes which can be employed as $OX_2$ or $RED_1$ are $Fe^{3+/2+}$, $Ni^{3+/2+}$, $Co^{3+/2+}$, $Cu^{2+/+}$, $[Fe(CN)_6]^{3-/4-}$, $Fe_4[Fe(CN)_6]_3{}^{0/4-}$, $[Co(CN)_6]^{3-/4-}$, $[Fe(cyclopentadienyl)_2]^{0/+}$, $Lu(PC)^{2+}$ $^{to}$ $^{2-}$ (Pc=phthalocyanine), $Fe[Fe(CN)_6]^{0/1-}$.

Suitable counterions for metal ions and cationic complexes are all redox-inert anions $X^-$, as described more precisely later, and suitable counterions of the anionic complexes are all redox-inert cations $M^{'+}$, for example alkali metals or quaternary ammonium salts, such as $Na^+$, $K^+$, $N(CH_3)_4{}^+$, $N(C_4H_9)_4{}^+$, $C_6H_5CH_2N(CH_3)_3{}^+$ and others.

$OX_2'$ and $RED_1'$ in the formulae (CCII) to (CCIV) are taken to mean, in particular, radicals of the above-described redox systems of the formulae (I) to (X), (CI) to (CIV) and (XX) to (XXXIII), where the bridging units B, B' and B" are attached via one of the radicals $R^2$ to $R^{19}$, $R^{22}$ to $R^{27}$, $R^{28}$ to $R^{58}$, $R^{61}$, $R^{62}$, $R^{67}$, $R^{68}$, $R^{83}$, $R^{88}$, $R^{122}$ or, in the case where one of the radicals $E^1$ or $E^2$ is $NR^1$ or one of the radicals $E^3$ to $E^{11}$ is $NR^{59}$ or one of the radicals $E^{101}$ to $E^{102}$ is $NR^{119}$, via $R^1$, $R^{59}$ or $R^{119}$, and said radicals are then a direct bond. In this case, $—B'—R^{203}$, $—B"—R^{204}$ and $—B'—R^{205}$ have the meaning defined above for $R^2$ to $R^{19}$, $R^{22}$ to $R^{27}$, $R^{28}$ to $R^{58}$, $R^{61}$, $R^{62}$, $R^{67}$, $R^{68}$, $R^{83, R88}$, $R^{122}$ or, in the case where one of the radicals $E^1$ or $E^2$ is $NR^1$ or one of the radicals $E^3$ to $E^{11}$ is $NR^{59}$ or one of the radicals $E^{101}$ to $E^{102}$ is $NR^{119}$, the meaning of $R^1$, $R^{59}$ or $R^{119}$.

$OX_2'$ and $RED_1'$ in the formulae (CCII) to (CCIV) are very particularly taken to mean radicals of the above-described redox systems of the formulae (I), (II), (V), (XX), (XXII), (XXIII), (XXV), (XXVI) and (XXXIII).

Particular preference is given to electrochromic devices according to the invention which comprise a) an electrochromic substance $OX_2$ of the formulae (CC) or (CCI) and additionally an electrochromic substance $OX_2$ of the formula (I) and an electrochromic substance $RED_1$ of the formula (XXVI) or an electrochromic substance $OX_2$—B—$RED_1$, which comprises, as $OX_2$, a radical of the formula (I) and, as $RED_1$, a radical of the formula (XXVI), and optionally an electrochromic substance $RED_1$ of the formula (XXVI), or b) an electrochromic substance of the formula (CCIII) and additionally an electrochromic substance $OX_2$ of the formula (I) and optionally an electrochromic substance $RED_1$ of the formula (XXVI) or an electrochromic substance $OX_2$—B—$RED_1$, which comprises, as $OX_2$, a radical of the formula (I) and, as $RED_1$, a radical of the formula (XXVI), and optionally an electrochromic substance $RED_1$ of the formula (XXVI).

Examples of very particularly preferred combinations of redox systems are the following:

a1)

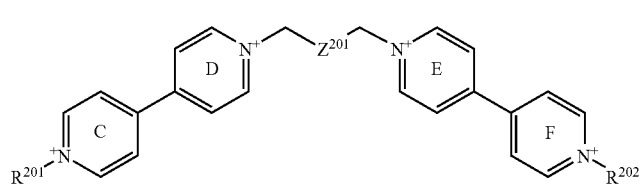

(CC)+

4 X⁻

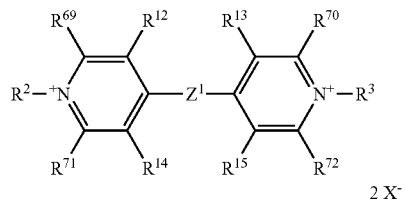

(I)+

2 X⁻

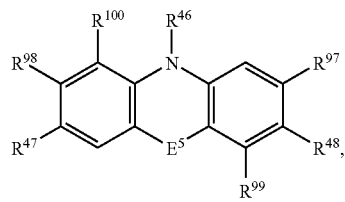

(XXVI)

a2)
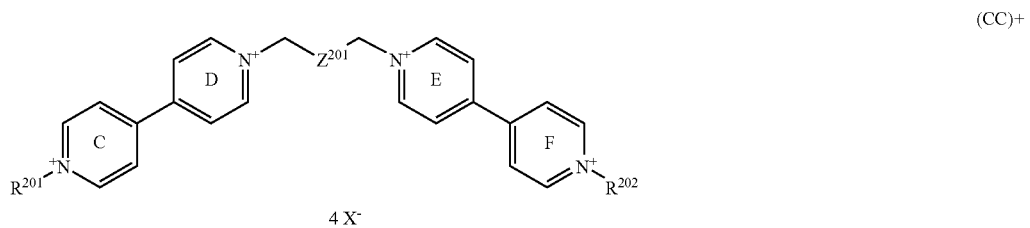
(CC)+
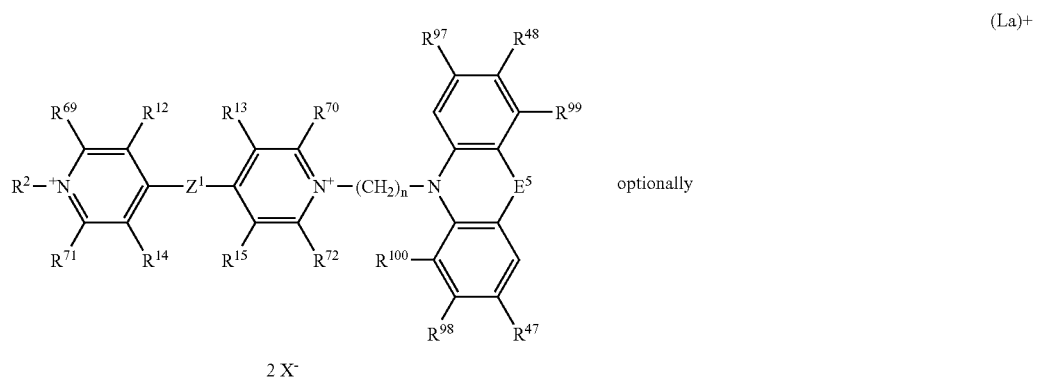
(La)+
b1)
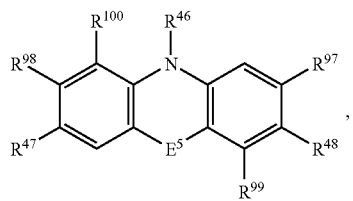
(XXVI)
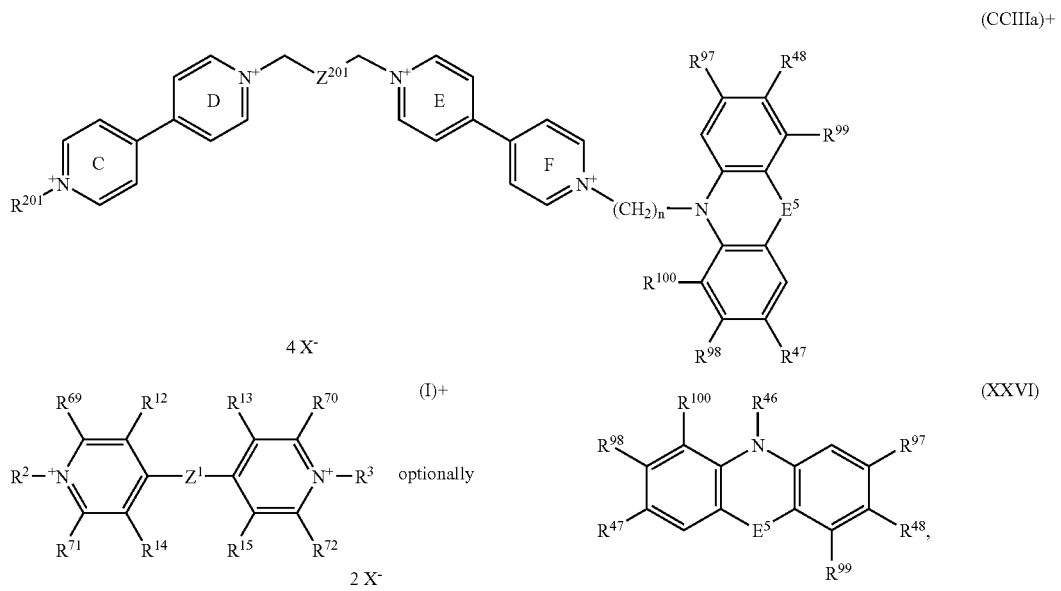
(CCIIIa)+

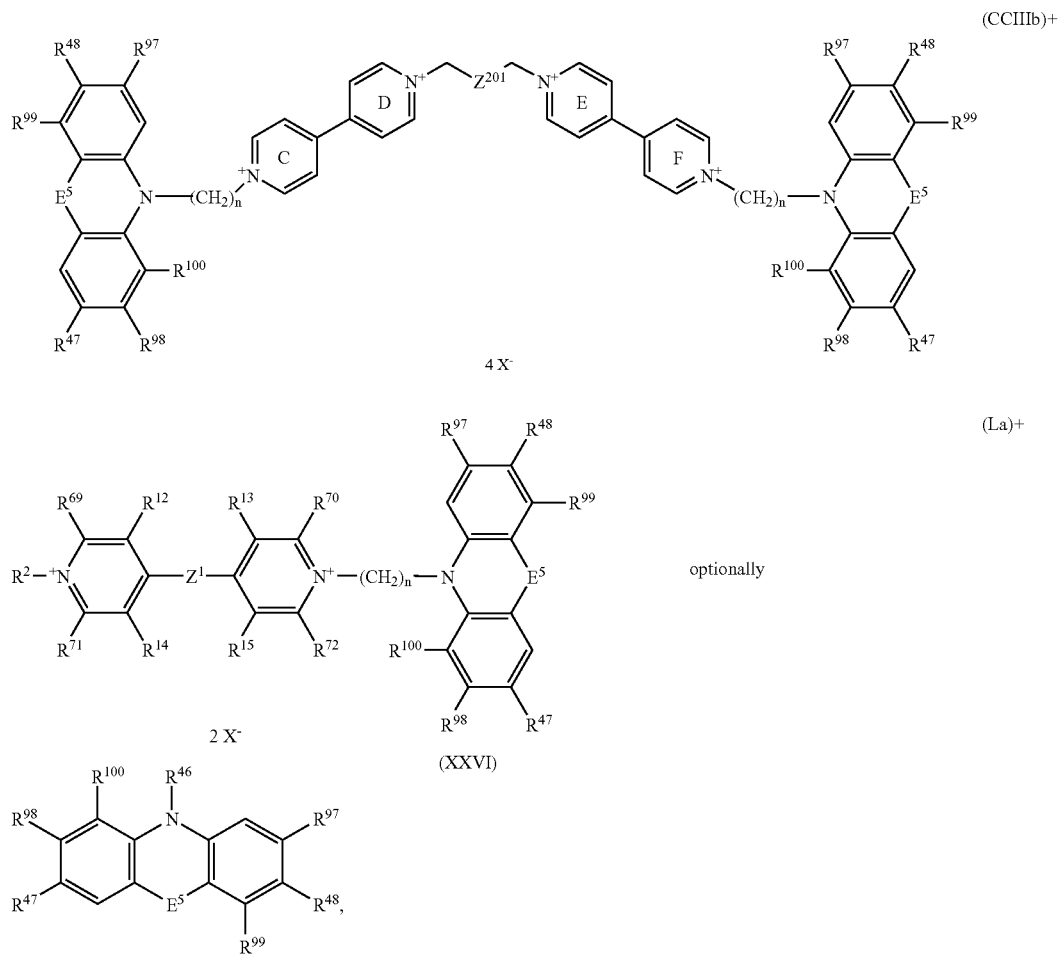

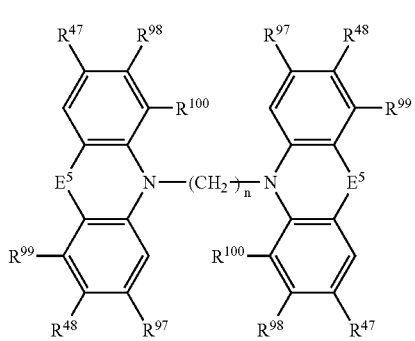

in which
Z¹ is a direct bond,
$R^{12}$ to $R^{15}$, $R^{47}$, $R^{48}$, $R^{69}$ to $R^{72}$ and $R^{97}$ to $R^{100}$ are hydrogen,
$E^5$ is $NR^{59}$,
the rings C to F are not bridged,
and the remaining radicals are as defined above in general, preferred or particularly preferred terms.

Instead of the electrochromic compounds of the formula (XXVI), analogous compounds of the formula (Lf)

may likewise be employed in these very particularly preferred combinations, in which
$R^{47}$, $R^{48}$, $R^{69}$ to $R^{72}$ and $R^{97}$ to $R^{100}$ are hydrogen,
$E^5$ is $NR^{59}$, and
$R^{59}$ and n are as defined above in general, preferred or particularly preferred terms.

The mixing ratios are variable within broad limits. They allow a desired colour, in particular the degree of blackness, to be optimized and/or the desired dynamics of the device to be optimized. An example of the mixing ratios for the following combination is: formula (CC) 1–25%+formula (I) 40–90%+formula (XXVI) 10–90%.

In the substituent definitions given above, alkyl radicals, including derivatives, are, for example, alkoxy or aralkyl radicals, preferably those having 1 to 12 C atoms, in particular having 1 to 8 C atoms, unless stated otherwise. They can be straight-chain or branched and can optionally carry further substituents, such as $C_1$- to $C_4$-alkoxy, fluorine, chlorine, hydroxyl, cyano, $C_1$- to $C_4$-alkoxycarbonyl or COOH.

The term cycloalkyl radicals is preferably taken to mean those having 3 to 7 carbon atoms, in particular having 5 or 6 carbon atoms.

Alkenyl radicals are preferably those having from 2 to 8 carbon atoms, in particular 2 to 4 carbon atoms.

Aryl radicals, including those in aralkyl radicals, are phenyl or naphthyl radicals, in particular phenyl radicals. They can be substituted by 1 to 3 of the following radicals: $C_1$- to $C_6$-alkyl, $C_1$- to $C_6$-alkoxy, fluorine, chlorine, bromine, cyano, hydroxyl, $C_1$- to $C_6$-alkoxycarbonyl or nitro. Two adjacent radicals can also form a ring.

The term optionally benzo-fused aromatic or quasi-aromatic, five- or six-membered heterocyclic rings is taken to mean, in particular, imidazole, benzimidazole, oxazole, benzoxazole, thiazole, benzothiazole, indole, pyrazole, triazole, thiophene, isothiazole, benzisothiazole, 1,3,4- or 1,2,4-thiadiazole, pyridine, quinoline, pyrimidine and pyrazine. They may be substituted by 1 to 3 of the following radicals: $C_1$- to $C_6$-alkyl, $C_1$- to $C_6$-alkoxy, fluorine, chlorine, bromine, cyano, nitro, hydroxyl, mono- or di-$C_1$- to $C_6$-alkylamino, $C_1$- to $C_6$-alkoxycarbonyl, $C_1$- to $C_6$-alkyl-sulfonyl, $C_1$- to $C_6$-alkanoylamino, phenyl or naphthyl. Two adjacent radicals may also form a ring.

The invention furthermore provides electrochromic substances of the formulae (CC) to (CCIV), in which the remaining radicals are as defined above in general, preferred or particularly preferred terms,
with the proviso that, in formula (CC),
$R^{201}$ and $R^{202}$ may not both be methyl, ethyl or benzyl when $Z^{201}$ is $CH_2$, and
$R^{201}$ and $R^{202}$ may not both be benzyl when $Z^{201}$ is o-phenylene, and
with the proviso that, in formula (CCI),
$Z^{201}$ is o-phenylene,
$R^{201}$ and $R^{202}$ together are a direct bond,
k is 1 and
B is o-phenylene or —$(CH_2)_3$—.

Compounds of the formula (CC) can advantageously prepared in accordance with the following scheme:

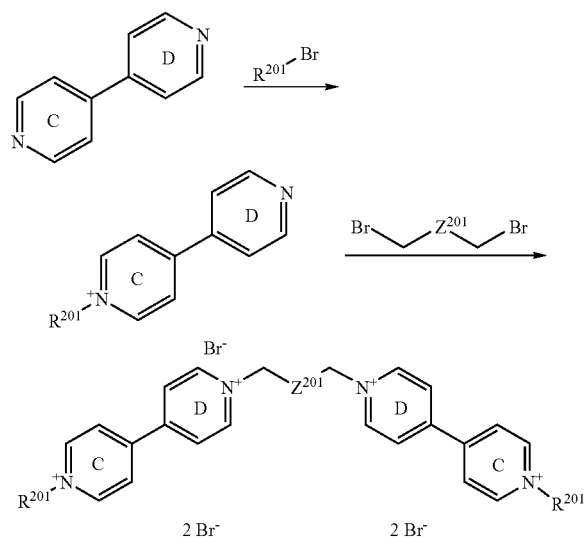

Compounds of the formulae (CCI) to (CCIV) can be prepared analogously, in particular analogously to compounds of the formula (L).

The electrochromic substances of the formulae (I) to (XII), (XX) to (XXXIII) and (CI) to (CIV) are either known (Topics in Current Chemistry, Vol. 92, pp. 1–44, (1980), Angew. Chem. 90, 927 (1978)) or can be prepared analogously. The compounds of the formula (L) are likewise known (WO 97/30134).

Ions resulting from the synthesis, such as bromide, are subsequently replaced by redox-inert ions.

The electrochromic substances of the formula (CC) according to the invention show two reversible reduction stages in the cyclic voltammogram. The distance between the two reduction potentials $\Delta E = E_2 - E_1$ is increased significantly, i.e. by at least 80 mV, compared to unbridged viologens or viologens not bridged according to the invention having an otherwise identical or similar substitution pattern.

The invention furthermore provides an electrochromic medium comprising at least one electrochromic substance of one of the formulae (CC) to (CCIV), in which the remaining radicals are as defined above in general, preferred or particularly preferred terms.

If desired, the electrochromic medium comprises at least one solvent in which the electrochromic substances, if used a conductive salt and if used further additives are dissolved. The solvent may also be thickened in the form of a gel, for example by polyelectrolytes, porous solids or nanoparticles having large active surface areas. In particular, the electrochromic medium does not contain any solvent when the electrochromic substances obtained are oligomeric or polymeric.

Suitable solvents are all solvents which are redox-inert under the selected voltages and which cannot eliminate electrophiles or nucleophiles or themselves react as sufficiently strong electrophiles or nucleophiles and thus could react with the coloured free-radical ions. Examples are propylene carbonate, γ-butyrolactone, acetonitrile, propionitrile, benzonitrile, glutaronitrile, methylglutaronitrile, 3,3'-oxy-dipropionitrile, dimethylformamide, N-methylpyrrolidone, sulfolane, 3-methyl-sulfolane or mixtures thereof. Preference is given to propylene carbonate, benzonitrile and mixtures with one another or with glutaronitrile or 3-methylsulfolane. Particular preference is given to propylene carbonate. Particular preference is likewise given to benzonitrile.

The electrochromic medium can contain at least one inert conductive salt. In particular if at least one of the substances of the redox pair $RED_1/OX_2$ is of ionic nature, the addition of a conductive salt can be omitted.

Suitable inert conductive salts are lithium, sodium and tetraalkylammonium salts, in particular the latter. The alkyl groups can contain between 1 and 18 carbon atoms and can be identical or different. Preference is given to tetrabutylammonium. Suitable anions for these salts, in particular as anions $X^-$ in the formulae (I) to (VI), (CI), (CII) and (CV) to (CVII) and in the metal salts, are all redox-inert, colourless anions.

Examples are tetrafluoroborate, tetraphenylborate, cyanotriphenylborate, tetramethoxyborate, tetrapropoxyborate, tetraphenoxyborate, perchlorate, chloride, nitrate, sulphate, phosphate, methanesulphonate, ethanesulphonate, tetradecanesulphonate, pentadecanesulphonate, trifluoromethanesulphonate, perfluorobutanesulphonate, perfluorooctanesulphonate, benzenesulphonate, chlorobenzenesulphonate, toluenesulphonate, butylbenzenesulphonate, tert-butylbenzenesulphonate, dodecylbenzenesulphonate, trifluoromethylbenzenesulphonate, hexafluorophosphate, hexafluoroarsenate, hexafluorosilicate, 7,8- or 7,9-dicarbanidoundecaborate(−1) or (−2), which are optionally substituted on the B and/or C atoms by one or two methyl, ethyl, butyl or phenyl groups, dodecahydro-dicarbadodecaborate(−2) or B-methyl-C-phenyl-dodecahydro-dicarbadodecaborate(−1).

Likewise suitable, including as anions $X^-$ in the formulae (CC) to (CCIV), (I) to (VI), (CI), (CII) and (CV) to (CVII)

and in the metal salts, are the abovementioned anions which can also take on the role of an $RED_1$, for example $I^-$ and $I_3^-$.

The conductive salts are preferably employed in the range from 0 to 1 mol/l.

Further additives which can be employed are thickeners in order to control the viscosity of the electro-active solution. This can be of importance for avoiding segregation, i.e. the formation of coloured streaks or spots on extended operation of the electrochromic device in the switched-on state, and for controlling the fading rate after the current is switched off.

Suitable thickeners are all compounds customary for this purpose, such as, for example, polyacrylate, polymethacrylate (Luctite L®), polycarbonate or polyurethane.

Suitable further additives for the electrochromic medium for the occasionally desired protection against UV light (<350 nm) are UV absorbers. Examples are UVINUL® 3000 (2,4-dihydroxybenzophenone, BASF), SANDUVOR® 3035 (2-hydroxy-4-n-octyloxybenzophenone, Clariant), Tinuvin® 571 (2-(2H-benzotriazol-2-yl)-6-dodecyl-4-methylphenol, Ciba), Cyasorb 24™ (2,2'-dihydroxy-4-methoxy-benzophenone, American Cyanamid Company), UVINUL® 3035 (ethyl 2-cyano-3,3-diphenylacrylate, BASF), UVINUL® 3039 (2-ethylhexyl 2-cyano-3,3-diphenyl-acrylate, BASF), UVINUL® 3088 (2-ethylhexyl p-methoxycinnamate, BASF), CHIMASSORB® 90 (2-hydroxy-4-methoxy-benzophenone, Ciba), SANDUVOR® PR-25 (dimethyl 4-methoxybenzylidenemalonate, Clariant).

Preference is given to the five last-mentioned compounds. Preference is likewise given to mixtures of UV absorbers, for example of the four last-mentioned compounds. Particular preference is given to the mixture of UVINUL® 3039 and CHIMASSORB® 90 or SANDUVOR® PR-25 and CHIMASSORB® 90.

Further additives can be yellow filters, such as

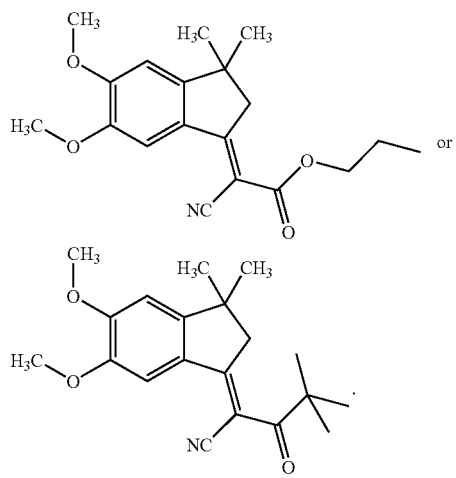

These filters absorb radiation between 350 and 400 nm.

The UV absorbers and yellow filters are employed in the range from 0.01 to 2 mol/l, preferably from 0.04 to 1 mol/l.

The electrochromic solution contains each of the electrochromic substances $OX_2$ and $RED_1$ in a concentration of at least $10^{-4}$ mol/l, preferably from 0.001 to 0.5 mol/l. The total concentration of all electrochromic substances present is preferably less than 1 mol/l.

In order to operate the electrochromic device according to the invention, a constant, pulsed or amplitude-varying, for example sinusoidal, direct current is used. The voltage depends on the desired colour depth, but in particular on the reduction or oxidation potentials of the $OX_2$ and $RED_1$ used. Such potentials can be found, for example, in Topics in Current Chemistry, Volume 92, pp. 1–44, (1980) or Angew. Chem. 90, 927 (1978) or in the references cited therein. The difference in their potentials is a guide for the requisite voltage, but the electrochromic device can be operated at lower or higher voltage. In many cases, for example when using $OX_2$=formula (CC) and $RED_1$=formula (XXVI), this potential difference necessary for operation is $\leq 1$ V. Such electrochromic devices can therefore be supplied in a simple manner with the current from photovoltaic silicon cells.

When the voltage is switched off, the electrochromic device according to the invention returns to its original state. This erasing can be considerably accelerated if the contacted segments or plates are short-circuited. The display can also be erased very rapidly by repeated reversal of the voltage, optionally also with simultaneous reduction in the voltage.

By varying the layer thickness of the electrochromic device, the viscosity of the electrochromic solution and/or the diffusibility or driftability of the electrochromic substances, the switch-on and switch-off times of the display device can be modified within broad limits. Thus, for example, thin layers exhibit shorter switching times than thick layers. It is thus possible to construct fast- and slow-switchable devices and thus to match them to the particular applications in an optimum manner.

In slow devices, in particular display devices, a power-saving or refresh mode can be used in the switched-on state in order to maintain the displayed information. After the information to be displayed has been built up, for example by direct voltage of sufficient level which is constant or varying with high frequency or pulsed, the voltage is switched to pulsed or varying direct voltage of low frequency, with the contacting of the segments not being short-circuited during the phases in which the voltage is zero. This low frequency can be, for example, in the region of 1 Hz or lower, while the durations of the switch-on and switch-off phases need not be of equal length, but instead, for example, the switch-off phases can be significantly longer. Since the colour depth of the displayed information only drops slowly during the current pauses in the non-short-circuited state, relatively short current pulses are sufficient to compensate for these losses again in the subsequent refresh phase. In this way, a flicker-free image with virtually constant colour depth is obtained, but its maintenance requires only a fraction of the current that would arise in the case of permanent current flow.

Specific embodiments of the abovementioned types 1 and 2 can be, for example, the following, which are likewise provided by the invention if they comprise the electrochromic substances according to the invention.

The use of the electrochromic compounds of the formula (CC) according to the invention together with at least one suitable $RED_1$, e.g. of the formula (XXVI), in an electrochromic device shows a significantly higher light stability of the cell in the switched-on state than an electrochromic device which utilizes an analogous unbridged viologen of the formula (I) together with an $RED_1$, e.g. of the formula (XXVI).

Type 1: (Non-mirrored)

from the light protection/light filter area: window panes for buildings, road vehicles, aircraft, railways, ships, roof glazing, automobile sunroofs, glazing of greenhouses and conservatories, light filters of any desired type;

from the security/confidentiality area: separating panes for room dividers in offices, road vehicles, aircraft, railways, sight protection screens, for example at bank counters, door glazing, visors for motorcycle or pilot helmets;

from the design area: glazing of ovens, microwave equipment, other domestic appliances, furniture;

from the display area: analogue voltage displays, as battery testers, tank displays, and temperature displays.

Type 1: (Mirrored)

Mirrors of all types for road vehicles, railways, in particular planar, spherical, aspherical mirrors and combinations thereof, such as spherical/aspherical mirror glazing in furniture.

Type 2:

Display devices of all types, segment or matrix displays for watches, computers, electrical equipment, electronic equipment, such as radios, amplifiers, TV sets, CD players, destination displays in buses and trains, departure displays in stations and airports, flat screens, all applications mentioned under types 1 and 2 which contain at least one switchable static or variable display device, such as separating screens containing displays such as "Please do not disturb", "Counter closed", automobile mirrors containing displays of any desired type, such as temperature display, vehicle fault display, for example oil temperature, open doors, time, compass direction.

EXAMPLES

Example 1

9.6 g of 3-phenyl-1-bromopropane were added dropwise over the course of 45 min to 15.0 g of 4,4'-bipyridyl in 90 ml of toluene at 70° C. The mixture was stirred for 24 h at reflux temperature, cooled down and the solid was filtered off with suction. The solid was stirred in 90 ml of toluene for 4 h at reflux temperature, cooled down, filtered off with suction and washed with toluene. Drying in vacuo gave 14.3 g (85% of theory) 4-(4-pyridyl)-1-(3-phenylpropyl)pyridinium bromide.

2.5 g of the above product were stirred with 0.7 g of 1,3-dibromopropane in 35 ml of butyrolactone with the addition of 0.1 g of tetrabutylammonium iodide at 70° C. for 48 h. The mixture was cooled down, and the solid was filtered off with suction, washed with a little butyrolactone and toluene and dried in vacuo. 3.0 g (94% of theory) of the electrochromic substance of the formula (CCCIa) were obtained as a beige powder.

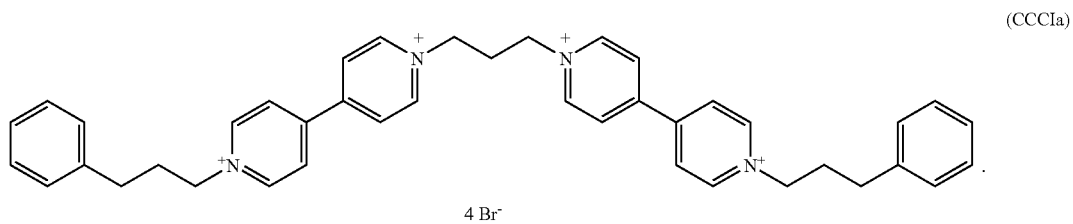

(CCCIa)

4 Br⁻

$^1$H NMR ([D$_6$]-DMSO): δ=2.36 (quint.), 2.71 (t), 2.83 (quint.), 4.78 (t), 4.93 (t), 7.24 (m), 8.88 (dd), 9.5 (dd).

2.0 g of the above product were heated to reflux in 45 ml of methanol. 5.7 g of tetrabutylammonium tetrafluoroborate were added. The suspension was boiled for 30 min with stirring and cooled down, and the solid was filtered off with suction. The solid was again added to 45 ml of methanol and admixed with 2.9 g of tetrabutylammonium tetrafluoroborate, and the mixture was boiled for 4 h with stirring. The mixture was cooled down, and the solid was filtered off with suction, washed with methanol and dried in vacuo. 1.5 g (72% of theory) of (CCCIb)

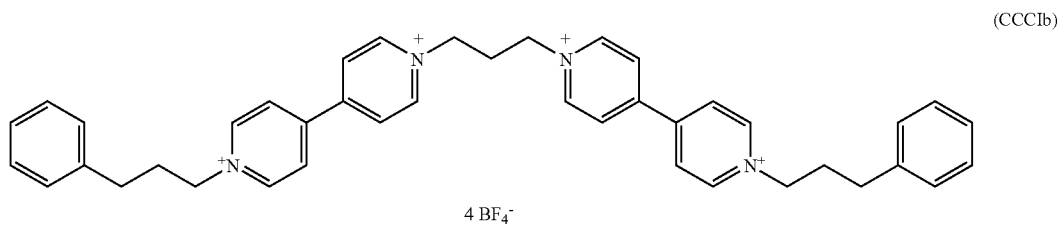

(CCCIb)

4 BF$_4^-$ were obtained as a beige powder.

Cyclic voltammogram (recorded in acetonitrile, conductive salt tetrabutylammonium tetrafluoroborate, glassy carbon electrode, v=200 mV/s, reference electrode Ag/AgCl, potential converted to SHE): $E_1$=−858 mV, $E_2$=−311 mV, ΔE=547 mV.

The following electrochromic compounds were prepared analogously:

| Example | Formula | Colour (of a cell as described in Example 4) | ΔE (determined as described in Example 1) |
|---|---|---|---|
| 1a | 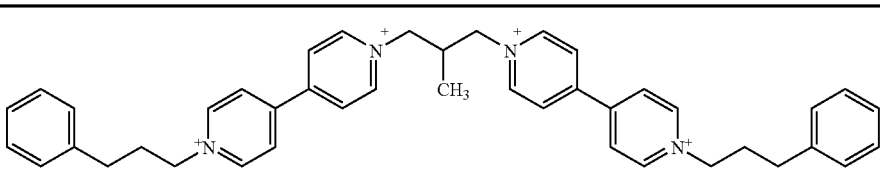 4 BF$_4^-$ | red | 550 mV |
| 1b | 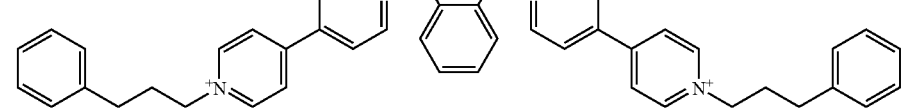 4 BF$_4^-$ | bluish red, 540 nm, 860 nm | 560 mV |
| 1c | 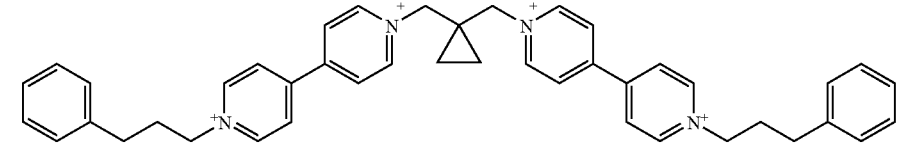 4 BF$_4^-$ | red | 548 mV |
| 1d | 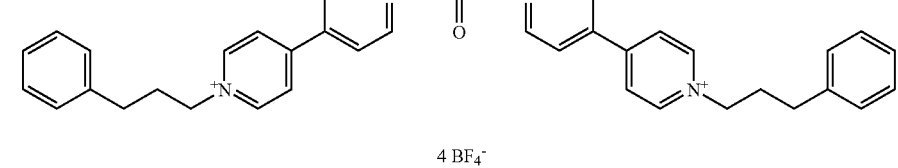 4 BF$_4^-$ | purple | |
| 1e | 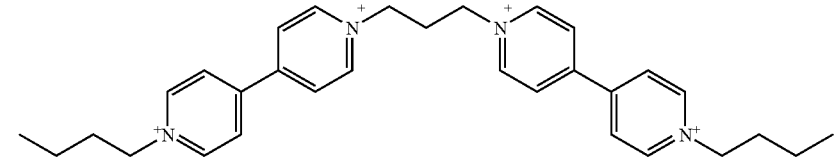 4 BF$_4^-$ | red | |
| 1f | 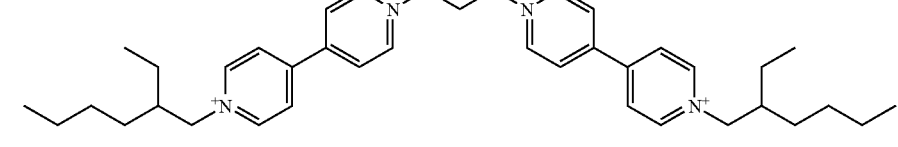 4 BF$_4^-$ | red | |

-continued

| Example | Formula | Colour (of a cell as described in Example 4) | ΔE (determined as described in Example 1) |
|---|---|---|---|
| 1g | 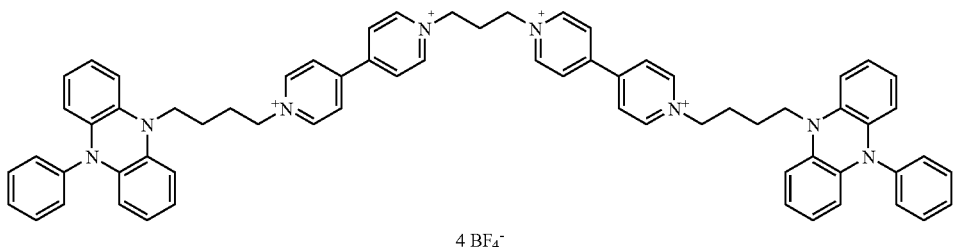 4 BF$_4^-$ | brown | 565 mV |
| 1h | 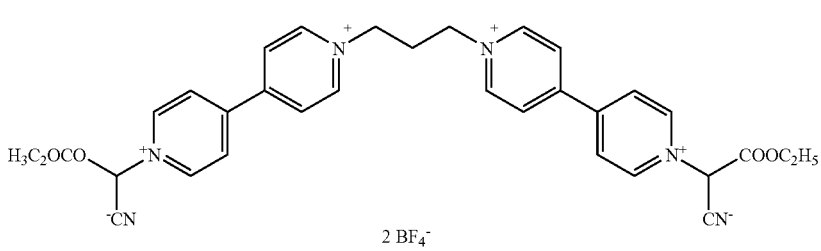 2 BF$_4^-$ | purple | |
| 1i | 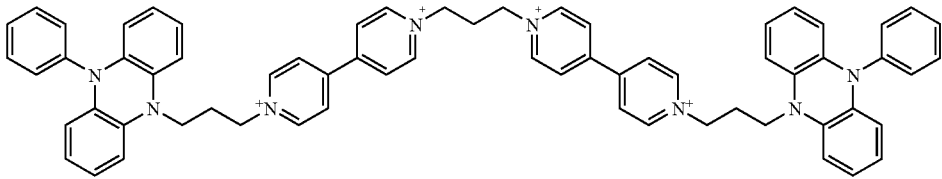 4 BF$_4^-$ | brown | |

Example 2

A cell was constructed as shown in FIG. 1. To this end, two glass plates 1 and 2 coated on one surface with ITO were used.

A mixture of 97% of photocuring DELO-Katiobond® 4594 epoxy adhesive (DELO Industrieklebstoffe, Landsberg) and 3% of glass beads with a diameter of 200 μm were applied in a ring shape 3 to the ITO-coated side of glass plate 1 in such a way that a 2 mm wide opening 4 was left. Glass plate 2 was then placed on the adhesive bead in such a way that the ITO layers of the two plates 1 and 2 were facing one another and a geometry as shown in FIG. 1 was formed. The adhesive was cured by exposure for 10 minutes to daylight in the vicinity of a window and then for 20 minutes at 105° C. without exposure to light.

A dish was filled under a nitrogen atmosphere with a solution which was 0.02 molar with respect to the electrochromic compound of the formula

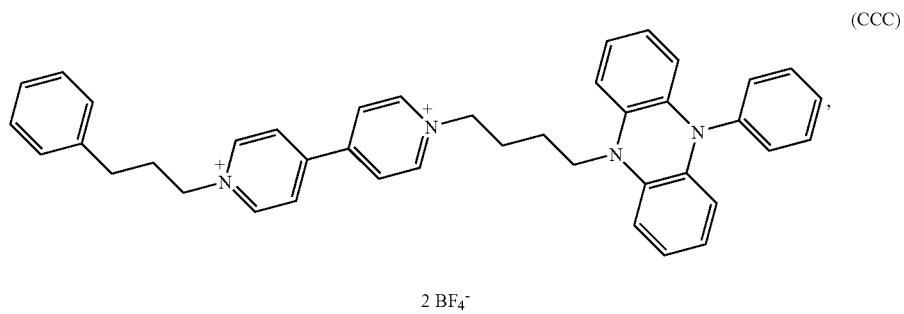

(CCC)

2 BF$_4^-$ 0.0025 molar with respect to the electrochromic compound of the formula

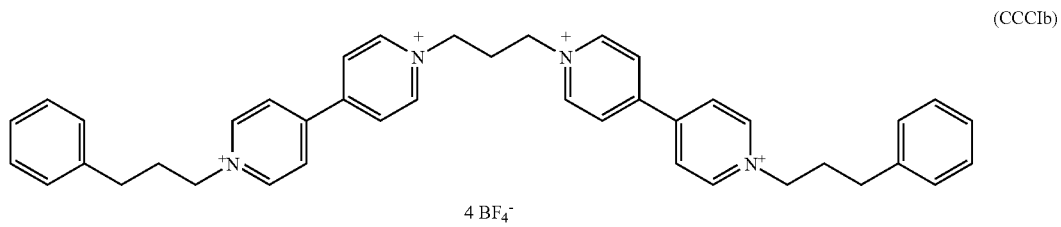

(CCCIb)

4 BF$_4^-$ and 0.005 molar with respect to the electrochromic compound of the formula

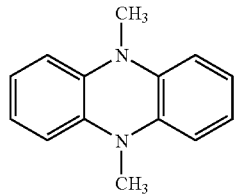

(CCCII)

and 0.1 molar with respect to each of the UV absorbers of the formulae

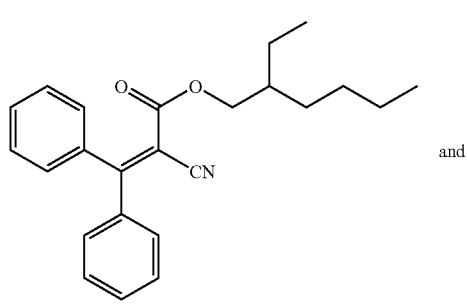

(CCCX)

and

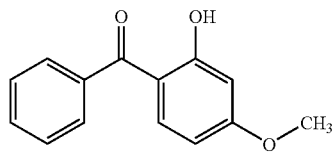

(CCCXI)

in anhydrous, oxygen-free propylene carbonate.

The cell was then placed vertically in the dish under a nitrogen atmosphere in such a way that the opening 4 was located beneath the liquid level. The dish with the cell was placed in a desiccator, which was evacuated to 0.05 mbar and then carefully aerated with nitrogen. During the aeration, the electrochromic solution rose through the opening 4 into the cell and filled the entire volume apart from a small bubble. The cell was removed from the solution, cleaned at the opening 4 under a nitrogen atmosphere by wiping with a paper towel and sealed with the photochemically curable acrylate adhesive DELO-Photobond® 4497 (DELO Industrieklebstoffe, Landsberg). The cell was then exposed for 1 minute under a nitrogen atmosphere with a DELOLUX® 03 lamp (DELO Industrieklebstoffe, Landsberg) at a distance of 8 cm from the opening 4, and cured at room temperature overnight under a nitrogen atmosphere.

Application of a voltage of 1.2 V to the two plates 1 and 2 caused the cell rapidly to turn black. Switching off the voltage and short-circuiting the contacts caused the colour rapidly to disappear again. 100 000 switching cycles of this type were conducted without any change in the switching behaviour.

In the coloured state, the cell displayed absorption maxima at 399 nm, 466 nm, 550 nm, 606 nm, 665 nm and 738 nm having absorbencies of 3.99, 1.64, 1.35, 1.36, 0.95 and 0.65, respectively.

Example 3

A cell was constructed as described in Example 2 except that the electrochromic compound of the formula (CCCII) was used in a concentration of 0.01 mol.

Application of a voltage of 1.2 V to the two plates 1 and 2 caused the cell rapidly to turn black. Switching off the voltage and short-circuiting the contacts caused the colour rapidly to disappear again. 100 000 switching cycles of this type were conducted without any change in the switching behaviour.

In the coloured state, the cell displayed absorption maxima at 399 nm, 466 nm, 550 nm, 606 nm, 665 nm and 738 nm having absorbencies of 5.36, 2.06, 1.78, 1.82, 1.25 and 0.81, respectively.

Example 4

A cell was constructed as described in Example 2 except that it was filled with a solution which was 0.01 molar with respect to the electrochromic compound of the formula

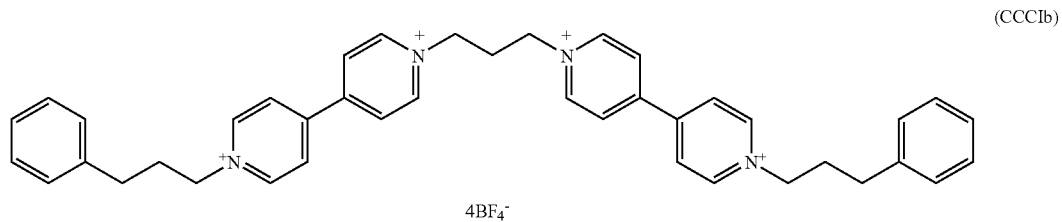

(CCCIb)

4BF$_4^-$ 0.02 molar with respect to ferrocene

(CCCIII)

and 0.1 molar with respect to each of the UV absorbers of the formulae

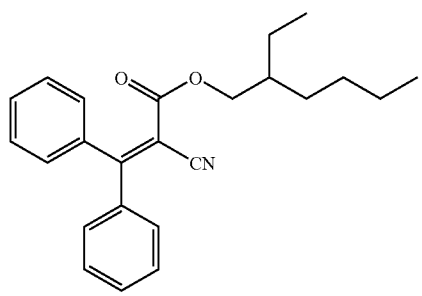

(CCCX)

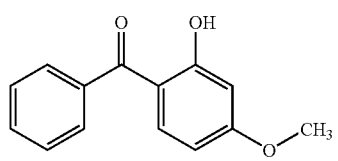

(CCCXI)

in anhydrous, oxygen-free propylene carbonate.

Application of a voltage of 0.9 V to the two plates 1 and 2 caused the cell rapidly to turn red. Switching off the voltage and short-circuiting the contacts caused the colour rapidly to disappear again. 100 000 switching cycles of this type were conducted without any change in the switching behaviour.

In the coloured state, the cell displayed absorption maxima at 538 nm and 847 nm having absorbencies of 1.2 and 0.64, respectively.

Example 5

A cell was constructed as described in Example 2 except that it was filled with a solution which was 0.02 molar with respect to the electrochromic compound of the formula

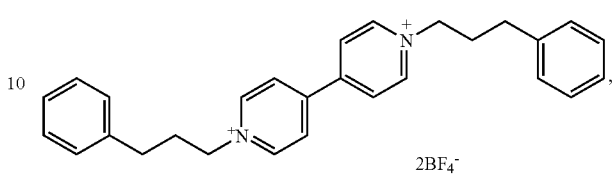

(CCCIV)

0.007 molar with respect to the electrochromic compound of the formula

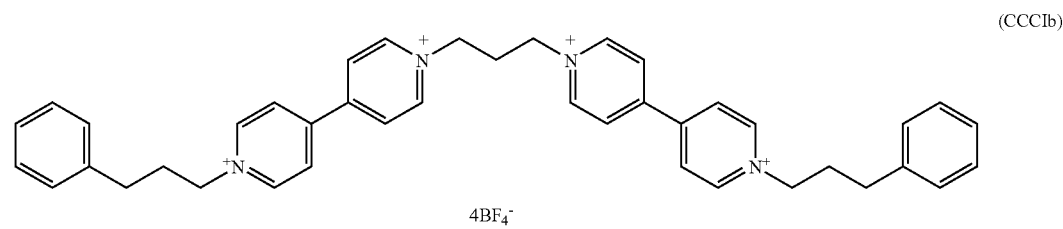

(CCCIb)

and 0.03 molar with respect to the electrochromic compound of the formula

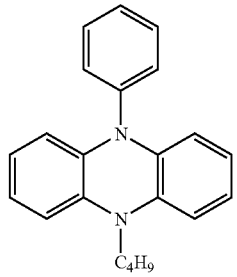

(CCCV)

and 0.1 molar with respect to each of the UV absorbers of the formulae

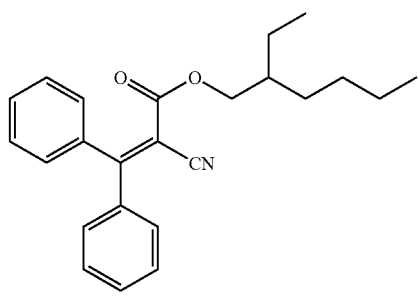

(CCCX)

and (CCCXI)

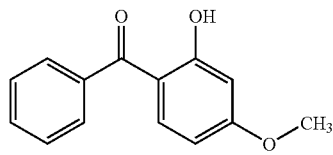

in anhydrous, oxygen-free propylene carbonate.

Application of a voltage of 0.9 V to the two plates 1 and 2 caused the cell rapidly to turn black. Switching off the voltage and short-circuiting the contacts caused the colour rapidly to disappear again. 100 000 switching cycles of this type were conducted without any change in the switching behaviour.

Example 6 Comparative Example, Not According to the Invention

The electrochromic substance of the formula (CD)

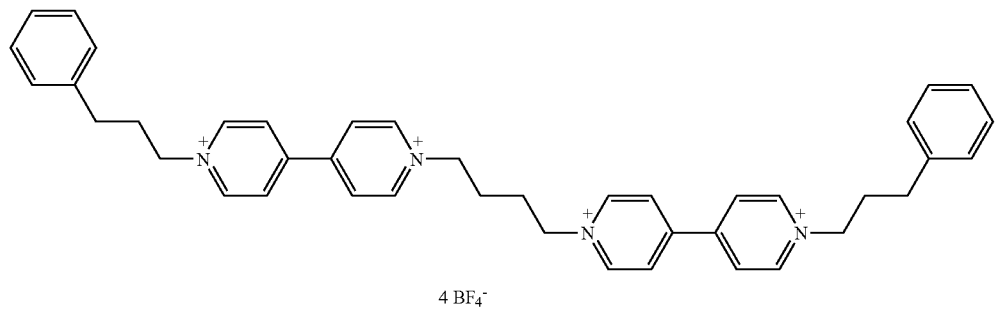

4 BF$_4^-$ was prepared as a white powder analogously to Example 1 using 1,4-dibromobutane instead of 1,3-dibromopropane.

Cyclic voltammogram (recorded as in Example 1): $E_1$=−818 mV, $E_2$=−375 mV, $\Delta E$=443 mV.

A cell was constructed as described in Example 4 which was 0.01 molar with respect to the electrochromic compound of the formula (CD) instead of the electrochromic compound of the formula (CCCIb). Application of a voltage of 0.9 V caused the cell to turn blue with absorption maxima at 555 nm, 605 nm, 660 nm and 733 nm having absorbencies of 0.59, 0.63, 0.36 and 0.22, respectively.

Example 7 Comparative Example, Not According to the Invention

Electrochromic compound of the formula (CDI)

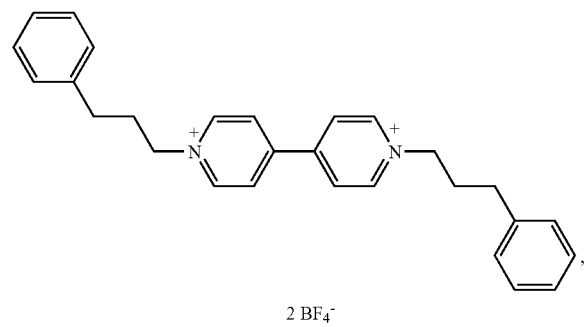

2 BF$_4^-$ known from WO 98/44384, formula C1.

Cyclic voltammogram (recorded as in Example 1): $E_1$=−810 mV, $E_2$=−390 mV, $\Delta E$=420 mV.

Example 8 Daylight Stability, According to the Invention

A cell was constructed as described in Example 2 which was filled with a solution which was 0.01 molar with respect to the compound of the formula (CCCIb) (cf. Example 2) and 0.02 molar with respect to the compound of the formula (CCCII) (cf. Example 2) in anhydrous, oxygen-free propylene carbonate and which did not contain any UV absorbers.

Example 9 Daylight Stability Comparative Example

A cell was constructed as described in Example 2 which was filled with a solution which was 0.02 molar with respect to the compound of the formula (CDI) (cf. Example 7) and 0.02 molar with respect to the compound of the formula (CCCII) (cf. Example 2) in anhydrous, oxygen-free propylene carbonate and which did not contain any UV absorbers.

Light Stability Test

To test the light stability, cells as described in Example 8 together with reference cells as described in Example 9 were exposed at an operating voltage of 0.9 V in a Suntest CPS+ test apparatus from Atlas, Linsengericht-Altenhaßlau, equipped with the dish-shaped filter plate A and using an irradiation power of 765 W/m$^2$.

Before the beginning of irradiation, absorption spectra of each cell were recorded in the switched (0.9 V) and in the unswitched (0 V) state using a Cary 4G absorption photometer (Varian, Darmstadt).

Irradiation took place at certain intervals (see table). After each irradiation interval, absorption measurements were again carried out in the switched and unswitched states. These measurements were used to produce the difference spectra, the instantaneous spectra being plotted minus the initial spectra in both the switched and unswitched states.

The damage to the cell was defined by the decrease in the electrochromic swing. This denotes the decrease in the transmission change at a particular wavelength.

Evaluation took place at the maximum wavelength at 538 nm for cells from Example 8 and at 605 nm for cells from Example 9. In evaluating the difference spectra it is necessary to take account of the fact that changes in the transmission in the unswitched state also appear in the difference spectra of the switched state, where they have to be subtracted.

The following table shows the decrease in the electrochromic swing over the cumulative irradiation time for the cell from Example 8 according to the invention and, for comparison, the reference cell according to Example 9.

| In % | 0 h | 70 h | 140 h | 210 h | 250 h | 500 h | 1100 h |
|---|---|---|---|---|---|---|---|
| Cell according to Example 8 | 100 | 97 | 92 | 86 | — | 81 | 55 |
| Cell according to Example 9 | 100 | 84 | 58 | 44 | 40 | — | — |

If significant damage to the cell is defined as a loss of 20% of the electrochromic swing, the cell of Example 9 (not according to the invention) has a stability of about 85 hours. Using the bridged viologen according to invention (Example 8), this stability increases to 500 hours which corresponds to an improvement by a factor of 6.

The invention claimed is:

1. Electrochromic device comprising a pair of glass or plastic plates or plastic films of which at least one plate or film, preferably both plates or films, are provided an in each case one side with an electrically conductive coating, of which at least one plate or film and its conductive coating are transparent, of which the other may be mirrored, and of which in the case of at least one of the two plates or films the electrically conductive layer can be divided into separate, individually contacted area segments, where the plates or films are joined together via a sealing ring on the sides of their conductive coating, and the volume formed by the two plates or films and the sealing ring is filled with an electrochromic medium which comprises at least one reducible electrochromic substance $OX_2$ and at feast one oxidizable electrochromic substance $RED_1$, characterized in that one $OX_2$ corresponds to one of the formula

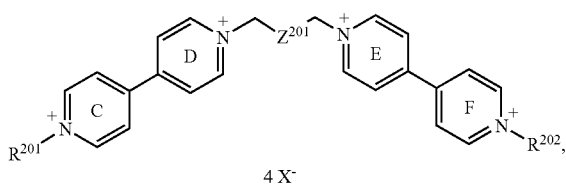

(CC)

wherein another electrochromic substance of the formula (CC) or another electrochromic substance $OX_2$ or $RED_1$ may be attached via the bridge B;

wherein the formula (CC) maybe pert of one of the formulae

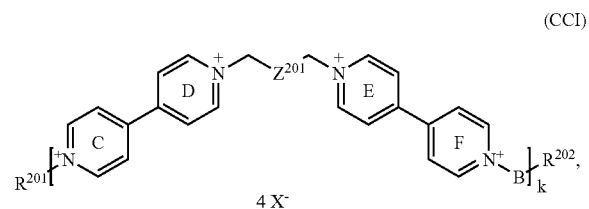

(CCI)

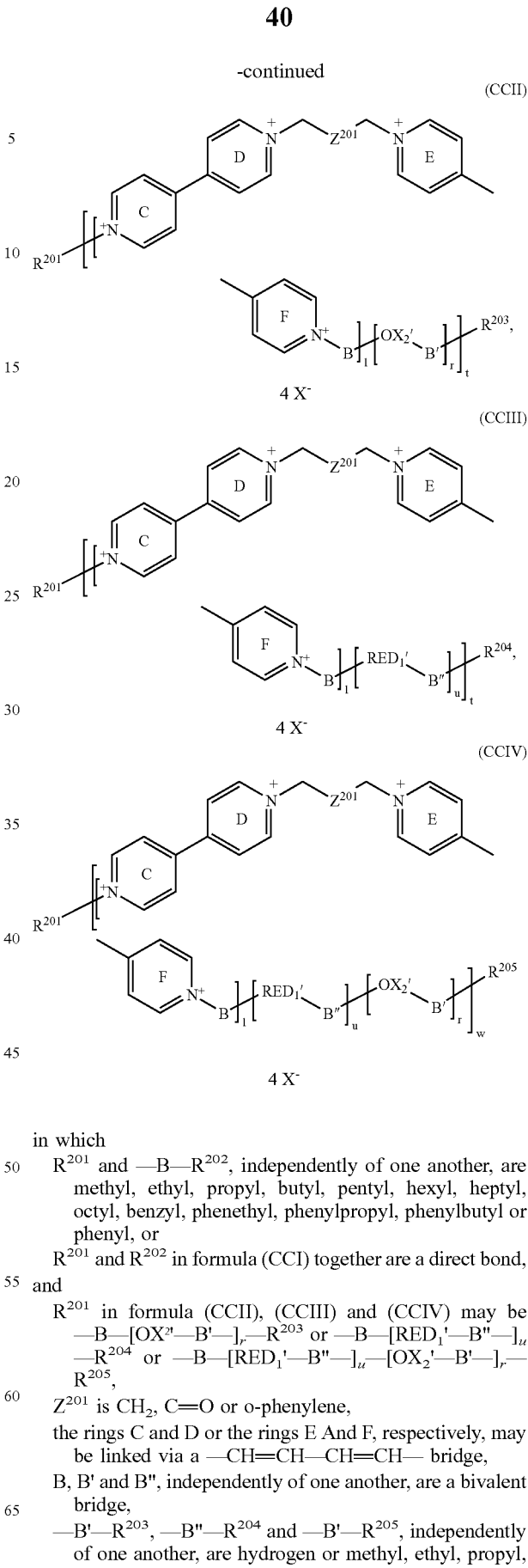

in which $R^{201}$ and —B—$R^{202}$, independently of one another, are methyl, ethyl, propyl, butyl, pentyl, hexyl, heptyl, octyl, benzyl, phenethyl, phenylpropyl, phenylbutyl or phenyl, or $R^{201}$ and $R^{202}$ in formula (CCI) together are a direct bond, and $R^{201}$ in formula (CCII), (CCIII) and (CCIV) may be —B—[$OX_2'$—B'—]$_r$—$R^{203}$ or —B—[$RED_1'$—B"—]$_u$—$R^{204}$ or —B—[$RED_1'$—B"—]$_u$—[$OX_2'$—B'—]$_r$—$R^{205}$, $Z^{201}$ is $CH_2$, C=O or o-phenylene, the rings C and D or the rings E And F, respectively, may be linked via a —CH=CH—CH=CH— bridge, B, B' and B", independently of one another, are a bivalent bridge, —B'—$R^{203}$, —B"—$R^{204}$ and —B'—$R^{205}$, independently of one another, are hydrogen or methyl, ethyl, propyl, butyl, pentyl, hexyl, heptyl, octyl, benzyl, phenethyl, phenylpropyl, phenylbutyl or phenyl, $OX_2'$ is the radical of a reversibly electrochemically reducible redox system, and $RED_1'$ is the radical of a reversibly electrochemically oxidizable redox system, k is an integer from 2 to 1000, I, r and u, independently of one another, are integers from 1 to 100, t and w, independently of one another, are integers from 1 to 1000, and $X^-$ is an anion.

2. Electrochromic device of the formula (CCIII) according to claim 1, in which I, u and t are 1.

3. Electrochromic device according to one or more of claims 1 to 2, characterized in that it comprises
   a) an electrochromic substance $OX_2$ of the formulas (CC) or (CCI) and additionally an electrochromic substance $OX_2$ of the formula (I) and an electrochromic substance $RED_1$ of the formula (XXVI) or an electrochromic substance $OX_2$—B—$RED_1$, which comprises, as $OX_2$, a radical of the formula (I) and, as $RED_1$, a radical of the formula (XXVI), and optionally an electrochromic substance $RED_1$ of the formula (XXVI), or
   b) an electrochromic substance of the formula (CCIII) and additionally an electrochromic substance $OX_2$ of the formula (I) and optionally an electrochromic substance $RED_1$ of the formula (XXVI) or an electrochromic substance $OX_2$—B—$RED_1$, which comprises, as $OX_2$, a radical of the formula (I) and, as $RED_1$, a radical of the formula (XXVI), and optionally an electrochromic substance $RED_1$ of the formula (XXVI).

4. Electrochromic substance of one of the formulae (CC) to (CCIV), in which the radicals are as defined in claims 1 to 2, with the proviso that, in formula (CC), $R^{201}$ and $R^{202}$ may not both be methyl, ethyl or benzyl when $Z^{201}$ is $CH_2$, and $R^{201}$ and $R^{202}$ may not both be benzyl when $Z^{201}$ is o-phenylene, and with the proviso that, in formula (CCI), $Z^{201}$ is o-phenylene, $R^{201}$ and $R^{202}$ together are a direct bond, k is 1 and B is o-phenylene or —$(CH_2)_3$—.

5. Electrochromic medium comprising at least one electrochromic substance of the formulae (CC) to (CCIV), in which the radicals are as defined in claims 1 to 2.

6. Use of the electrochromic device according to one or more of claims 1 to 2 as a window or separating screen or sight protection screen or glazing or roof glazing or light filter or mirror or display device.

* * * * *